United States Patent
Koo et al.

(10) Patent No.: US 12,316,848 B2
(45) Date of Patent: May 27, 2025

(54) IMAGE CODING METHOD BASED ON TRANSFORM, AND DEVICE THEREFOR

(71) Applicant: LG ELECTRONICS INC., Seoul (KR)

(72) Inventors: Moonmo Koo, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 17/790,907

(22) PCT Filed: Jan. 11, 2021

(86) PCT No.: PCT/KR2021/000339
§ 371 (c)(1),
(2) Date: Jul. 5, 2022

(87) PCT Pub. No.: WO2021/141472
PCT Pub. Date: Jul. 15, 2021

(65) Prior Publication Data
US 2023/0036126 A1 Feb. 2, 2023

(51) Int. Cl.
*H04N 19/132* (2014.01)
*H04N 19/176* (2014.01)
(Continued)

(52) U.S. Cl.
CPC ......... *H04N 19/132* (2014.11); *H04N 19/176* (2014.11); *H04N 19/18* (2014.11); *H04N 19/186* (2014.11); *H04N 19/46* (2014.11)

(58) Field of Classification Search
None
See application file for complete search history.

(56) References Cited

U.S. PATENT DOCUMENTS

| | | | | |
|---|---|---|---|---|
| 2014/0086311 A1* | 3/2014 | Lou | ......... | H04N 19/30 375/240.03 |
| 2018/0103252 A1* | 4/2018 | Hsieh | ......... | H04N 19/176 |

(Continued)

FOREIGN PATENT DOCUMENTS

| CN | 104521232 A | 4/2015 |
|---|---|---|
| CN | 109644269 A | 4/2019 |

(Continued)

OTHER PUBLICATIONS

Benjamin Bross, et al., "Versatile Video Coding (Draft 7)", Joint Video Experts Team (JVET) of ITU-T SG 16 WP 3 and ISO/IEC JTC 1/SC 29/WG 11, 16th Meeting: Geneva, CH, Oct. 1-11, 2019. JVET-P2001-vE.

(Continued)

*Primary Examiner* — Peter D Le
(74) *Attorney, Agent, or Firm* — Bryan Cave Leighton Paisner LLP

(57) ABSTRACT

An image decoding method according to the present document comprises the steps of: applying an LFNST to transform coefficients so as to derive modified transform coefficients; and deriving residual samples for a target block on the basis of an inverse primary transform for the modified transform coefficients, wherein the step of deriving the transform coefficients comprises: determining whether a scaling list is applied to a current block on the basis of a tree type of the current block and whether the LFNST is applied; and deriving transform coefficients for the current block from residual information on the basis of the determination result, and when the tree type of the current block is a single tree and a chroma component, the scaling list can be applied.

7 Claims, 17 Drawing Sheets

(51) Int. Cl.
  *H04N 19/18* (2014.01)
  *H04N 19/186* (2014.01)
  *H04N 19/46* (2014.01)

(56) References Cited

U.S. PATENT DOCUMENTS

| | | | | |
|---|---|---|---|---|
| 2021/0092408 | A1* | 3/2021 | Ramasubramonian | .................... H04N 19/61 |
| 2021/0195222 | A1* | 6/2021 | Egilmez | ................ H04N 19/647 |
| 2022/0103821 | A1* | 3/2022 | Paluri | ................... H04N 19/186 |
| 2022/0210451 | A1* | 6/2022 | Jung | ..................... H04N 19/159 |
| 2022/0377324 | A1* | 11/2022 | Yang | ..................... H04N 19/117 |
| 2022/0385904 | A1* | 12/2022 | Tsukuba | .................. H04N 19/12 |
| 2023/0032574 | A1* | 2/2023 | Lim | ...................... H04N 19/513 |
| 2023/0037302 | A1* | 2/2023 | Rosewarne | ........... H04N 19/136 |
| 2023/0179779 | A1* | 6/2023 | Tsukuba | .................. H04N 19/12 375/240.18 |
| 2023/0297833 | A1* | 9/2023 | Cho | ......................... G06N 3/08 382/155 |

FOREIGN PATENT DOCUMENTS

| KR | 101880642 | B1 | 7/2018 |
|---|---|---|---|
| KR | 20190058423 | A | 5/2019 |
| KR | 20190140423 | A | 12/2019 |
| WO | 2018/037737 | A1 | 1/2018 |
| WO | 2019107911 | A1 | 6/2019 |
| WO | 2020009556 | A1 | 9/2020 |

OTHER PUBLICATIONS

Tomonori Hashimoto, et al., "Fix on LFNST condition", Joint Video Experts Team (JVET) of ITU-T SG 16 WP 3 and ISO/IEC JTC 1/SC 29/WG 11, 17th Meeting: Brussels, BE, Jan. 7-17, 2020. JVET-Q0133.

Koo, et al. "Alternative methods of LFNST index signalling," LG Electronics, MPEG Meeting, JVET-R0318-v1, Apr. 2020.

Tomonori Hashimoto, et al., "Fix on LFNST condition", Joint Video Experts Team (JVET) 1 of ITU-T SG 16 WP 3 and ISO/IEC JTC 1/SC 29/WG 11, 17th Meeting: Brussels, BE, Jan. 7-17, 2020, JVET-Q0133-v2.

Qualcomm, Inc., "Chroma LFNST Simplification and Signaling," JVET of ITU-T SG 16 WP 3 and ISO/IEC JTC 1/SC 29/WG 11, JVET-Q0686-v1, Jan. 7-17, 2020, pp. 1-4.

* cited by examiner (a)

(c) 4xN / Nx4, when N≥16          (d) 8x8

(e) MxN(M≥8, N≥8, M>8 or N>8)

(a) 4x4

(b) 8x4 / 4x8

(c) 4xN / Nx4, when N≥16

(d) 8x8

(e) MxN(M≥8, N≥8, M>8 or N>8)

4xN / Nx4, when N≥16

(c) 4xN / Nx4, when N≥16

(d) 4xN / Nx4, when N≥16

(b) MxN(M≥8, N≥8, M>8 or N>8)

IMAGE CODING METHOD BASED ON TRANSFORM, AND DEVICE THEREFOR

CROSS-REFERENCE TO RELATED APPLICATION

This application is the National Stage filing under 35 U.S.C. 371 of International Application No. PCT/KR2021/000339, filed Jan. 11, 2021, which claims the benefit of U.S. Provisional Application No. 62/959,814, filed on Jan. 10, 2020, the contents of which are all hereby incorporated by reference herein in their entirety.

TECHNICAL FIELD

The present disclosure relates to an image coding technique and, more particularly, to a method and an apparatus for coding an image based on transform in an image coding system.

RELATED ART

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical aspect of the present disclosure is to provide a method and an apparatus for increasing image coding efficiency.

Another technical aspect of the present disclosure is to provide a method and an apparatus for increasing quantization efficiency.

Still another technical aspect of the present disclosure is to provide a method and an apparatus for increasing efficiency in quantization of a chroma component in a single-tree type.

According to an embodiment of the present disclosure, there is provided an image decoding method performed by a decoding apparatus. The method may include deriving transform coefficients for a current block based on residual information received from a bitstream, deriving modified transform coefficients by applying an LFNST to the transform coefficients, and deriving residual samples for the target block based on an inverse primary transform for the modified transform coefficients, wherein the deriving of the transform coefficients may include determining whether a scaling list is applied to the current block based on whether the LFNST is applied and a tree type of the current block, and deriving the transform coefficients for the current block from the residual information based on a determination result, and when the tree type of the current block is a single tree and the current block is a chroma component, the scaling list may be applied.

The LFNST may not be applied to the chroma component of the current block.

When the tree type of the current block is the single tree and the LFNST is performed on the current block, the scaling list may not be applied to a luma component of the current block.

The method may further include receiving flag information indicating whether the scaling list is available when the LFNST is performed.

When the flag information indicates that the scaling list is not available and the LFNST index is greater than 0, the scaling list may not be applied to the luma component.

When the flag information indicates that the scaling list is not available and the LFNST index is greater than 0, if the tree type of the current block is a dual-tree chroma, the scaling list may not be applied to the chroma component.

When the flag information indicates that the scaling list is not available and the LFNST index is greater than 0, if the tree type of the current block is a dual-tree luma, the scaling list may not be applied to the luma component.

According to another embodiment of the present disclosure, there is provided an image encoding method performed by an encoding apparatus. The method may include deriving transform coefficients for a current block from residual samples for the current block based on a transform process, determining whether a scaling list is applied to the current block based on whether an LFNST is performed in the transform process and a tree type of the current block, and quantizing the transform coefficients based on a determination, wherein when the tree type of the current block is a single tree and the current block is a chroma component, the scaling list may be applied.

According to still another embodiment of the present disclosure, there may be provided a digital storage medium that stores image data including encoded image information and a bitstream generated according to an image encoding method performed by an encoding apparatus.

According to yet another embodiment of the present disclosure, there may be provided a digital storage medium that stores image data including encoded image information and a bitstream to cause a decoding apparatus to perform the image decoding method.

According to the present disclosure, it is possible to increase overall image/video compression efficiency.

According to the present disclosure, it is possible to increase quantization efficiency.

According to the present disclosure, it is possible to increase efficiency in quantization of a chroma component in a single-tree type.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

BRIEF DESCRIPTION OF THE DRAWINGS

FIG. 7 is a diagram illustrating a sequence of arranging output data of a forward primary transformation into a one-dimensional vector according to an example.

FIG. 8 is a diagram illustrating a sequence of arranging output data of a forward secondary transform into a two-dimensional block according to an example.

FIG. 13 is a diagram illustrating zero-out in a block to which 4×4 LFNST is applied according to an example.

FIG. 14 is a diagram illustrating zero-out in a block to which 8×8 LFNST is applied according to an example.

DESCRIPTION OF EXEMPLARY EMBODIMENTS

Figure 1:
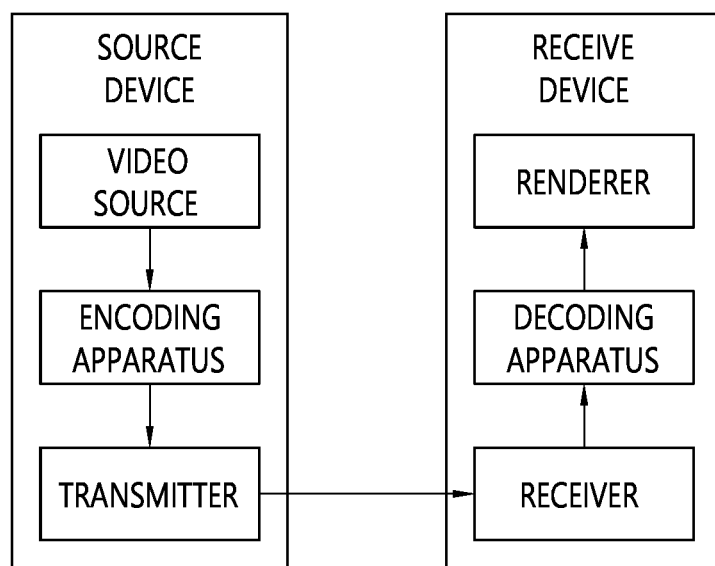
FIG. 1 schematically illustrates an example of a video/image coding system to which the present disclosure is applicable.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". In other words, the "prediction" of the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Technical features individually described in one figure in the present disclosure may be individually implemented or may be simultaneously implemented.

FIG. 1 schematically illustrates an example of a video/image coding system to which the present disclosure is applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
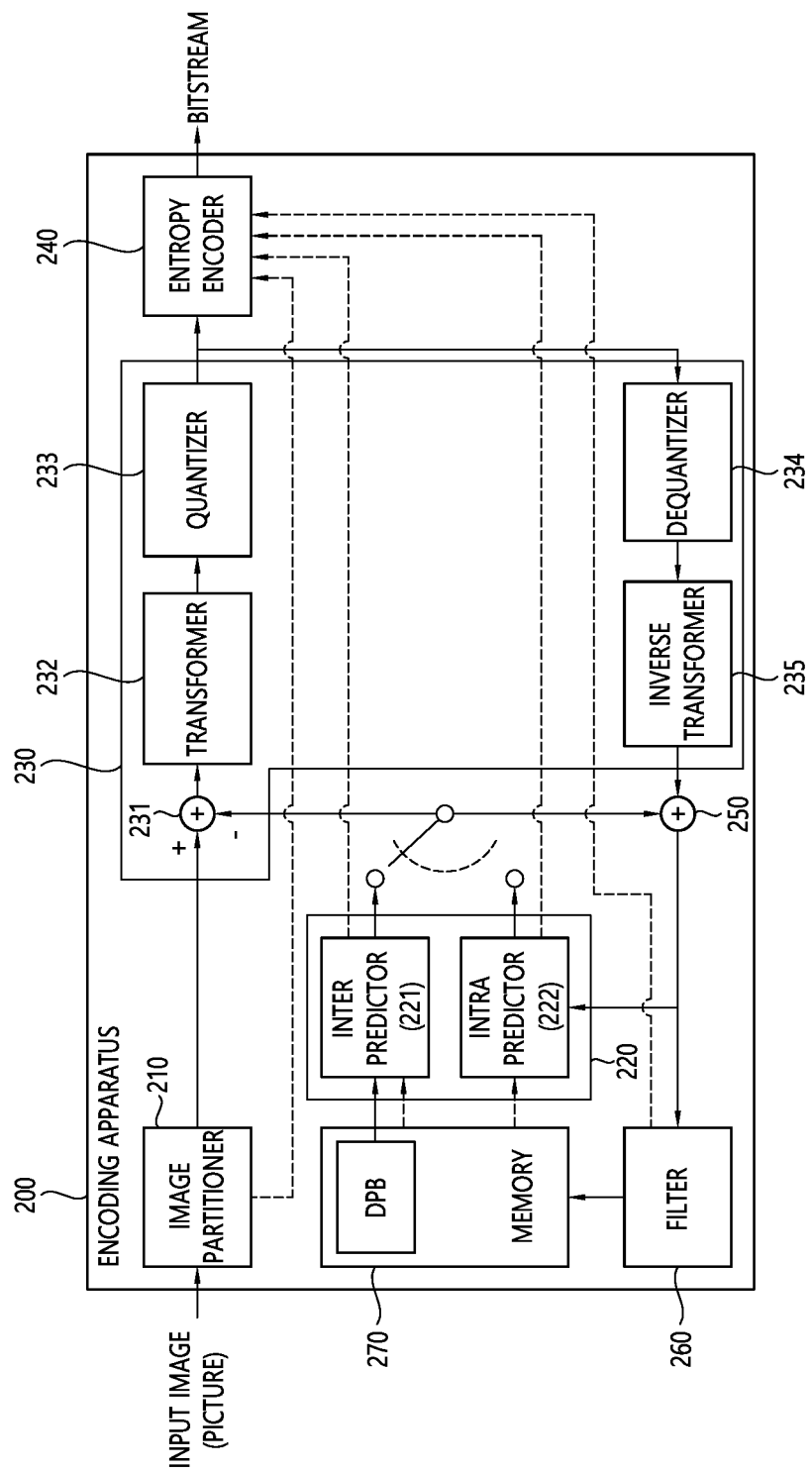
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor 231 subtracts a prediction signal (predicted block, prediction sample array) output from the predictor 220 from an input image signal (original block, original sample array) to generate a residual signal (residual block, residual sample array), and the generated residual signal is transmitted to the transformer 232. The predictor 220 may perform prediction on a processing target block (hereinafter, referred to as 'current block'), and may generate a predicted block including prediction samples for the current block. The predictor 220 may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loeve transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present disclosure, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
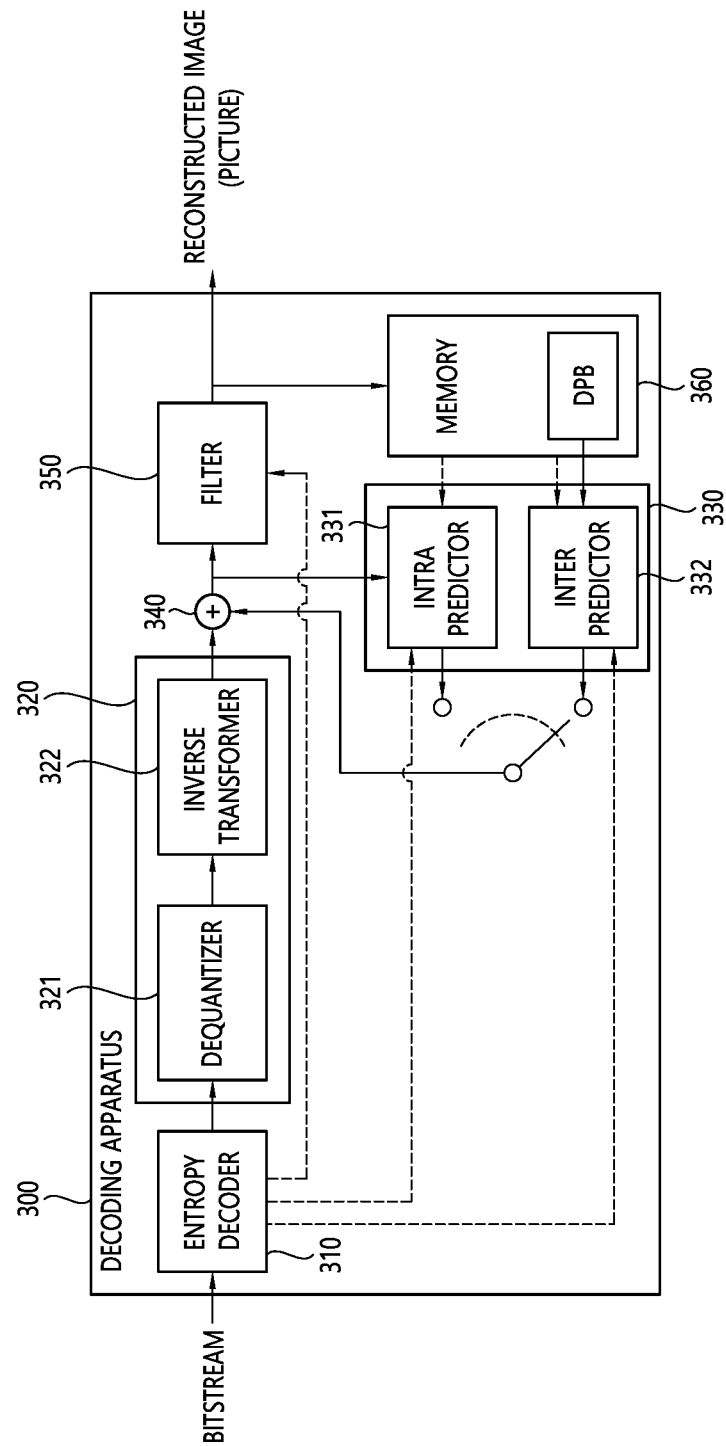
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The dequantizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may perform intra block copy (IBC) for prediction on a block. The intra block copy may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Figure 4:
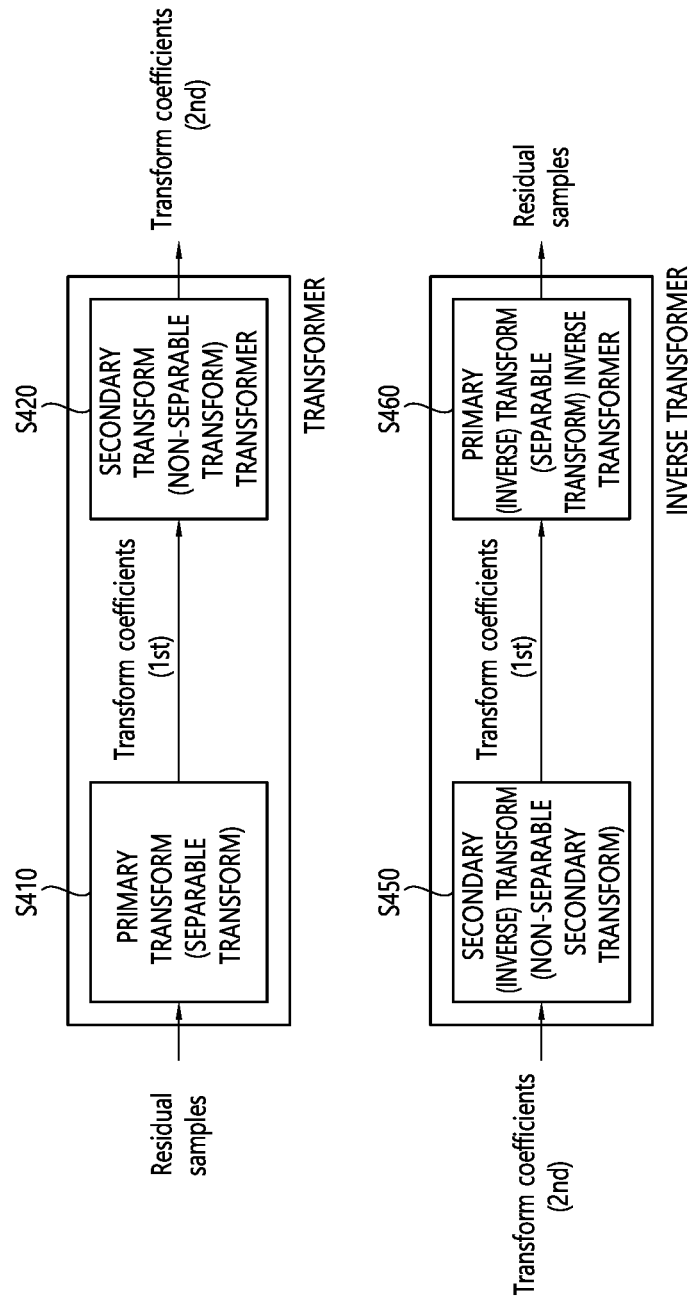
FIG. 4 is schematically illustrates a multiple transform scheme according to an embodiment of the present document.

FIG. 4 schematically illustrates a multiple transform technique according to an embodiment of the present disclosure.

Referring to FIG. 4, a transformer may correspond to the transformer in the encoding apparatus of foregoing FIG. 2, and an inverse transformer may correspond to the inverse transformer in the encoding apparatus of foregoing FIG. 2, or to the inverse transformer in the decoding apparatus of FIG. 3.

The transformer may derive (primary) transform coefficients by performing a primary transform based on residual samples (residual sample array) in a residual block (S410). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the primary transform coefficients may be called temporary transform coefficients from the viewpoint of the transformer.

In other words, when the conventional transform method is applied, transform coefficients might be generated by applying transform from a space domain to a frequency domain for a residual signal (or residual block) based on the DCT type 2. Unlike to this, when the multiple core transform is applied, transform coefficients (or primary transform coefficients) may be generated by applying transform from a space domain to a frequency domain for a residual signal (or residual block) based on the DCT type 2, the DST type 7, the DCT type 8, and/or DST type 1. Herein, the DCT type 2, the DST type 7, the DCT type 8, and the DST type 1 may be called a transform type, transform kernel or transform core. These DCT/DST transform types can be defined based on basis functions.

When the multiple core transform is performed, a vertical transform kernel and a horizontal transform kernel for a target block may be selected from among the transform kernels, a vertical transform may be performed on the target block based on the vertical transform kernel, and a horizontal transform may be performed on the target block based on the horizontal transform kernel. Here, the horizontal transform may indicate a transform on horizontal components of the target block, and the vertical transform may indicate a transform on vertical components of the target block. The vertical transform kernel/horizontal transform kernel may be adaptively determined based on a prediction mode and/or a transform index for the target block (CU or subblock) including a residual block.

Further, according to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trTypeVer value of 0 may be set to DCT2, a trTypeHor or trTypeVer value of 1 may be set to DST7, and a trTypeHor or trTypeVer value of 2 may be set to DCT8.

In this case, MTS index information may be encoded and signaled to the decoding apparatus to indicate any one of a plurality of transform kernel sets. For example, an MTS index of 0 may indicate that both trTypeHor and trTypeVer values are 0, an MTS index of 1 may indicate that both trTypeHor and trTypeVer values are 1, an MTS index of 2 may indicate that the trTypeHor value is 2 and the trTypeVer value. Is 1, an MTS index of 3 may indicate that the trTypeHor value is 1 and the trTypeVer value is 2, and an MTS index of 4 may indicate that both both trTypeHor and trTypeVer values are 2.

In one example, transform kernel sets according to MTS index information are illustrated in the following table.

TABLE 1

| tu_mts_idx[x0][y0] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may derive modified (secondary) transform coefficients by performing the secondary transform based on the (primary) transform coefficients (S420). The primary transform is a transform from a spatial domain to a frequency domain, and the secondary transform refers to transforming into a more compressive expression by using a correlation existing between (primary) transform coefficients. The secondary transform may include a non-separable transform. In this case, the secondary transform may be called a non-separable secondary transform (NSST), or a mode-dependent non-separable secondary transform (MDNSST). The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix. In other words, the non-separable secondary transform may represent a transform method in which is not separately applied in the vertical direction and the horizontal direction for the (primary) transform coefficients, and for example, two-dimensional signals (transform coefficients) are re-arranged to a one-dimensional signal through a certain determined direction (e.g., row-first direction or column-first direction), and then modified transform coefficients (or secondary transform coefficients) are generated based on the non-separable transform matrix. For example, according to a row-first order, M×N blocks are disposed in a line in an order of a first row, a second row, . . . , and an Nth row. According to a column-first order, M×N blocks are disposed in a line in an order of a first column, a second column, . . . , and an Nth column. The non-separable secondary transform may be applied to a top-left region of a block configured with (primary) transform coefficients (hereinafter, may be referred to as a transform coefficient block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min(8,W)×min(8,H) region of the transform coefficient block. However, the embodiment is not limited to this, and for example, even if only the condition that the width (W) or height (H) of the transform coefficient block is equal to or greater than 4 is satisfied, the 4×4 non-separable secondary transform may be applied to the top-left min(8,W)×min(8,H) region of the transform coefficient block.

Specifically, for example, if a 4×4 input block is used, the non-separable secondary transform may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$ [Equation 1]

If the X is represented in the form of a vector, the vector $\vec{X}$ may be represented as below.

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T$$ [Equation 2]

In Equation 2, the vector $\vec{X}$ is a one-dimensional vector obtained by rearranging the two-dimensional block X of Equation 1 according to the row-first order.

In this case, the secondary non-separable transform may be calculated as below.

$$\vec{F} = T \cdot \vec{X}$$ [Equation 3]

In this equation, $\vec{F}$ represents a transform coefficient vector, and T represents a 16×16 (non-separable) transform matrix.

Through foregoing Equation 3, a 16×1 transform coefficient vector $\vec{F}$ may be derived, and the $\vec{F}$ may be re-organized into a 4×4 block through a scan order (horizontal, vertical, diagonal and the like). However, the above-described calculation is an example, and hypercube-Givens transform (HyGT) or the like may be used for the calculation of the non-separable secondary transform in order to reduce the computational complexity of the non-separable secondary transform.

Meanwhile, in the non-separable secondary transform, a transform kernel (or transform core, transform type) may be selected to be mode dependent. In this case, the mode may include the intra prediction mode and/or the inter prediction mode.

As described above, the non-separable secondary transform may be performed based on an 8×8 transform or a 4×4 transform determined based on the width (W) and the height (H) of the transform coefficient block. The 8×8 transform refers to a transform that is applicable to an 8×8 region included in the transform coefficient block when both W and H are equal to or greater than 8, and the 8×8 region may be a top-left 8×8 region in the transform coefficient block. Similarly, the 4×4 transform refers to a transform that is applicable to a 4×4 region included in the transform coefficient block when both W and H are equal to or greater than 4, and the 4×4 region may be a top-left 4×4 region in the transform coefficient block. For example, an 8×8 transform kernel matrix may be a 64×64/16×64 matrix, and a 4×4 transform kernel matrix may be a 16×16/8×16 matrix.

Here, to select a mode-dependent transform kernel, two non-separable secondary transform kernels per transform set for a non-separable secondary transform may be configured for both the 8×8 transform and the 4×4 transform, and there may be four transform sets. That is, four transform sets may be configured for the 8×8 transform, and four transform sets may be configured for the 4×4 transform. In this case, each of the four transform sets for the 8×8 transform may include two 8×8 transform kernels, and each of the four transform sets for the 4×4 transform may include two 4×4 transform kernels.

However, as the size of the transform, that is, the size of a region to which the transform is applied, may be, for example, a size other than 8×8 or 4×4, the number of sets may be n, and the number of transform kernels in each set may be k.

The transform set may be referred to as an NSST set or an LFNST set. A specific set among the transform sets may be selected, for example, based on the intra prediction mode of the current block (CU or subblock). A low-frequency non-separable transform (LFNST) may be an example of a reduced non-separable transform, which will be described later, and represents a non-separable transform for a low frequency component.

For reference, for example, the intra prediction mode may include two non-directional (or non-angular) intra prediction modes and 65 directional (or angular) intra prediction modes. The non-directional intra prediction modes may include a planar intra prediction mode of No. 0 and a DC intra prediction mode of No. 1, and the directional intra prediction modes may include 65 intra prediction modes of Nos. 2 to 66. However, this is an example, and this document may be applied even when the number of intra prediction modes is different. Meanwhile, in some cases, intra prediction mode No. 67 may be further used, and the intra prediction mode No. 67 may represent a linear model (LM) mode.

Figure 5:
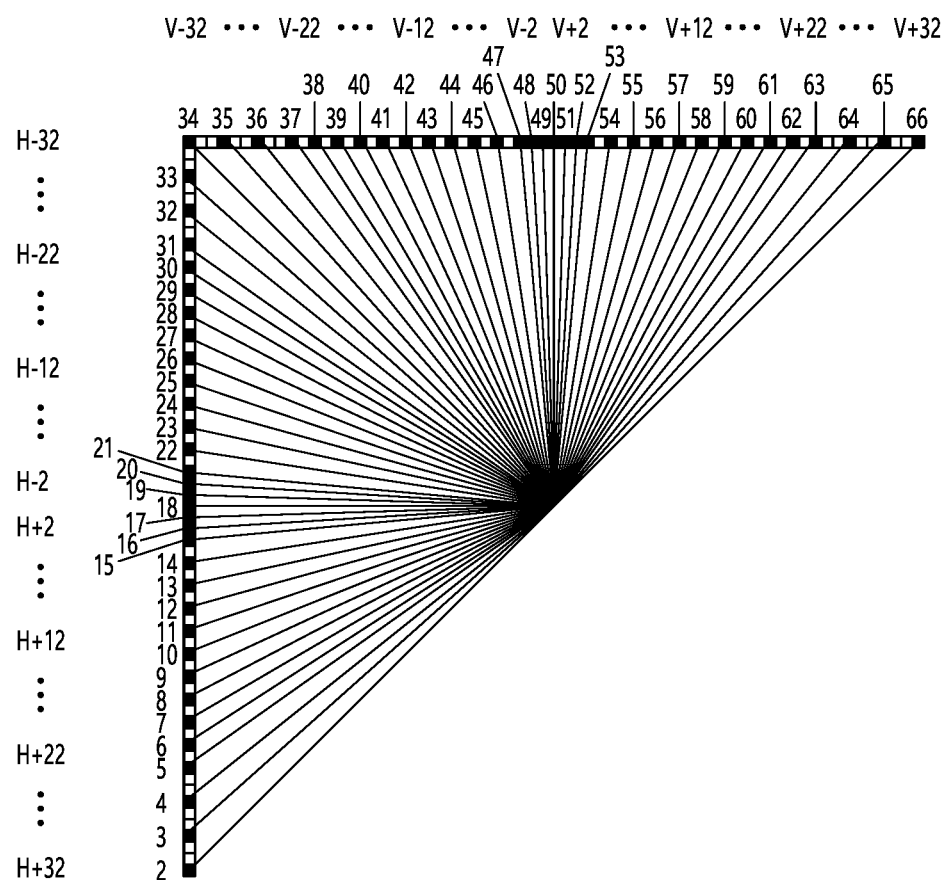
FIG. 5 exemplarily shows intra directional modes of 65 prediction directions.

FIG. 5 exemplarily shows intra directional modes of 65 prediction directions.

Referring to FIG. 5, on the basis of intra prediction mode 34 having a left upward diagonal prediction direction, the intra prediction modes may be divided into intra prediction modes having horizontal directionality and intra prediction modes having vertical directionality. In FIG. 5, H and V denote horizontal directionality and vertical directionality, respectively, and numerals −32 to 32 indicate displacements in 1/32 units on a sample grid position. These numerals may represent an offset for a mode index value. Intra prediction modes 2 to 33 have the horizontal directionality, and intra prediction modes 34 to 66 have the vertical directionality. Strictly speaking, intra prediction mode 34 may be considered as being neither horizontal nor vertical, but may be classified as belonging to the horizontal directionality in determining a transform set of a secondary transform. This is because input data is transposed to be used for a vertical direction mode symmetrical on the basis of intra prediction mode 34, and an input data alignment method for a horizontal mode is used for intra prediction mode 34. Transposing input data means that rows and columns of two-dimensional M×N block data are switched into N×M data. Intra prediction mode 18 and intra prediction mode 50 may represent a horizontal intra prediction mode and a vertical intra prediction mode, respectively, and intra prediction mode 2 may be referred to as a right upward diagonal intra prediction mode because intra prediction mode 2 has a left reference pixel and performs prediction in a right upward direction. Likewise, intra prediction mode 34 may be referred to as a right downward diagonal intra prediction mode, and intra prediction mode 66 may be referred to as a left downward diagonal intra prediction mode.

According to an example, the four transform sets according to the intra prediction mode may be mapped, for example, as shown in the following table.

TABLE 2

| predModeIntra | IfnstTrSetIdx |
| --- | --- |
| predModeIntra < 0 | 1 |
| 0 <= predModeIntra <= 1 | 0 |

TABLE 2-continued

| predModeIntra | IfnstTrSetIdx |
| --- | --- |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

As shown in Table 2, any one of the four transform sets, that is, lfnstTrSetIdx, may be mapped to any one of four indexes, that is, 0 to 3, according to the intra prediction mode.

When it is determined that a specific set is used for the non-separable transform, one of k transform kernels in the specific set may be selected through a non-separable secondary transform index. An encoding apparatus may derive a non-separable secondary transform index indicating a specific transform kernel based on a rate-distortion (RD) check and may signal the non-separable secondary transform index to a decoding apparatus. The decoding apparatus may select one of the k transform kernels in the specific set based on the non-separable secondary transform index. For example, lfnst index value 0 may refer to a first non-separable secondary transform kernel, lfnst index value 1 may refer to a second non-separable secondary transform kernel, and lfnst index value 2 may refer to a third non-separable secondary transform kernel. Alternatively, lfnst index value 0 may indicate that the first non-separable secondary transform is not applied to the target block, and lfnst index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S450), and may obtain a residual block (residual samples) by performing a primary (inverse) transform on the (primary) transform coefficients (S460). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The decoding apparatus may further include a secondary inverse transform application determinator (or an element to determine whether to apply a secondary inverse transform) and a secondary inverse transform determinator (or an element to determine a secondary inverse transform). The secondary inverse transform application determinator may determine whether to apply a secondary inverse transform. For example, the secondary inverse transform may be an NSST, an RST, or an LFNST and the secondary inverse transform application determinator may determine whether to apply the secondary inverse transform based on a secondary transform flag obtained by parsing the bitstream. In another example, the secondary inverse transform application determinator may determine whether to apply the secondary inverse transform based on a transform coefficient of a residual block.

The secondary inverse transform determinator may determine a secondary inverse transform. In this case, the secondary inverse transform determinator may determine the secondary inverse transform applied to the current block based on an LFNST (NSST or RST) transform set specified according to an intra prediction mode. In an embodiment, a secondary transform determination method may be determined depending on a primary transform determination method. Various combinations of primary transforms and secondary transforms may be determined according to the intra prediction mode. Further, in an example, the secondary inverse transform determinator may determine a region to which a secondary inverse transform is applied based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform.

Meanwhile, the transform kernel, the transform matrix, and the coefficient constituting the transform kernel matrix, that is, the kernel coefficient or the matrix coefficient, described in the present disclosure may be expressed in 8 bits. This may be a condition for implementation in the decoding apparatus and the encoding apparatus, and may reduce the amount of memory required to store the transform kernel with a performance degradation that can be reasonably accommodated compared to the existing 9 bits or 10 bits. In addition, the expressing of the kernel matrix in 8 bits may allow a small multiplier to be used, and may be more suitable for single instruction multiple data (SIMD) instructions used for optimal software implementation.

In the present specification, the term "RST" may mean a transform which is performed on residual samples for a target block based on a transform matrix whose size is reduced according to a reduced factor. In the case of performing the reduced transform, the amount of computation required for transform may be reduced due to a reduction in the size of the transform matrix. That is, the RST may be used to address the computational complexity issue occurring at the non-separable transform or the transform of a block of a great size.

RST may be referred to as various terms, such as reduced transform, reduced secondary transform, reduction transform, simplified transform, simple transform, and the like, and the name which RST may be referred to as is not limited to the listed examples. Alternatively, since the RST is mainly performed in a low frequency region including a non-zero coefficient in a transform block, it may be referred to as a Low-Frequency Non-Separable Transform (LFNST). The transform index may be referred to as an LFNST index.

Meanwhile, when the secondary inverse transform is performed based on RST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform for the modified transform coefficients. The inverse primary transform refers to the inverse transform of the primary transform applied to the residual. In the present disclosure, deriving a transform coefficient based on a transform may refer to deriving a transform coefficient by applying the transform.

Figure 6:
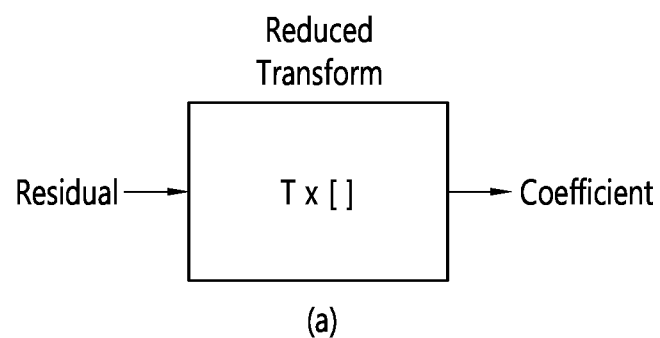
FIG. 6 is a diagram for explaining RST according to an embodiment of the present.
Figure 6:
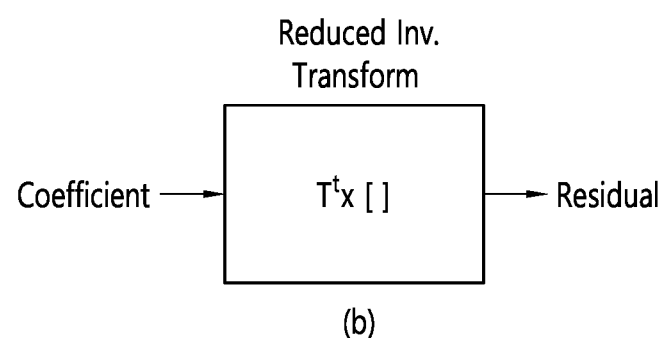

FIG. 6 is a diagram illustrating an RST according to an embodiment of the present disclosure.

In the present disclosure, a "target block" may refer to a current block to be coded, a residual block, or a transform block.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, simplified factor, simple factor or other various terms. Meanwhile, R may be referred to as a reduced coefficient, but according to circumstances, the reduced factor may mean R. Further, according to circumstances, the reduced factor may mean the N/R value.

In an example, the reduced factor or the reduced coefficient may be signaled through a bitstream, but the example is not limited to this. For example, a predefined value for the reduced factor or the reduced coefficient may be stored in each of the encoding apparatus 200 and the decoding apparatus 300, and in this case, the reduced factor or the reduced coefficient may not be signaled separately.

The size of the reduced transform matrix according to an example may be R×N less than N×N, the size of a conventional transform matrix, and may be defined as in Equation 4 below.

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix} \quad \text{[Equation 4]}$$

The matrix T in the Reduced Transform block shown in FIG. 6(a) may mean the matrix $T_{R \times N}$ of Equation 4. As shown in FIG. 6(a), when the reduced transform matrix $T_{R \times N}$ is multiplied to residual samples for the target block, transform coefficients for the target block may be derived.

In an example, if the size of the block to which the transform is applied is 8×8 and R=16 (i.e., R/N=16/64=¼), then the RST according to FIG. 6(a) may be expressed as a matrix operation as shown in Equation 5 below. In this case, memory and multiplication calculation can be reduced to approximately ¼ by the reduced factor.

In the present disclosure, a matrix operation may be understood as an operation of multiplying a column vector by a matrix, disposed on the left of the column vector, to obtain a column vector.

$$\begin{bmatrix} t_{1,1} & t_{1,2} & t_{1,3} & \cdots & t_{1,64} \\ t_{2,1} & t_{2,2} & t_{2,3} & & t_{2,64} \\ \vdots & & \ddots & & \vdots \\ t_{16,1} & t_{16,2} & t_{16,3} & \cdots & t_{16,64} \end{bmatrix} \times \begin{bmatrix} r_1 \\ r_2 \\ \vdots \\ r_{64} \end{bmatrix} \quad \text{[Equation 5]}$$

In Equation 5, r1 to r64 may represent residual samples for the target block and may be specifically transform coefficients generated by applying a primary transform. As a result of the calculation of Equation 5 transform coefficients ci for the target block may be derived, and a process of deriving ci may be as in Equation 6.

[Equation 6]

for i from to R:
  ci=0
  for j from 1 to N
    ci += tij * n

As a result of the calculation of Equation 6, transform coefficients c1 to cR for the target block may be derived. That is, when R=16, transform coefficients c1 to c16 for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the RST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix TN×R according to an example is N×R less than the size N×N of the regular inverse transform matrix, and is in a transpose relationship with the reduced transform matrix TR×N shown in Equation 4.

The matrix Tt in the Reduced Inv. Transform block shown in FIG. 6(*b*) may mean the inverse RST matrix TR×NT (the superscript T means transpose). When the inverse RST matrix TR×NT is multiplied to the transform coefficients for the target block as shown in FIG. 6(*b*), the modified transform coefficients for the target block or the residual samples for the current block may be derived. The inverse RST matrix TR×NT may be expressed as (TR×NT)N×R.

More specifically, when the inverse RST is applied as the secondary inverse transform, the modified transform coefficients for the target block may be derived when the inverse RST matrix TR×NT is multiplied to the transform coefficients for the target block. Meanwhile, the inverse RST may be applied as the inverse primary transform, and in this case, the residual samples for the target block may be derived when the inverse RST matrix TR×NT is multiplied to the transform coefficients for the target block.

In an example, if the size of the block to which the inverse transform is applied is 8×8 and R=16 (i.e., R/N=16/64=¼), then the RST according to FIG. 6(*b*) may be expressed as a matrix operation as shown in Equation 7 below.

$$\begin{bmatrix} t_{1,1} & t_{2,1} & & t_{16,1} \\ t_{1,2} & t_{2,2} & \cdots & t_{16,2} \\ t_{1,3} & t_{2,3} & & t_{16,3} \\ \vdots & & \ddots & \vdots \\ t_{1,64} & t_{2,64} & & t_{16,64} \end{bmatrix} \times \begin{bmatrix} c_1 \\ c_2 \\ \vdots \\ c_{16} \end{bmatrix} \quad \text{[Equation 7]}$$

In Equation 7, c1 to c16 may represent the transform coefficients for the target block. As a result of the calculation of Equation 7, ri representing the modified transform coefficients for the target block or the residual samples for the target block may be derived, and the process of deriving ri may be as in Equation 8.

[Equation 8]

For i from 1 to N
  r$_i$=0
  for j from 1 to R
    r$_i$ +=t$_{ji}$ * c$_j$

As a result of the calculation of Equation 8, r1 to rN representing the modified transform coefficients for the target block or the residual samples for the target block may be derived. When considered from the viewpoint of the size of the inverse transform matrix, the size of the regular inverse transform matrix is 64×64 (N×N), but the size of the reduced inverse transform matrix is reduced to 64×16 (R×N), so memory usage in a case of performing the inverse RST can be reduced by an R/N ratio when compared with a case of performing the regular inverse transform. In addition, when compared to the number of multiplication calculations N×N in a case of using the regular inverse transform matrix, the use of the reduced inverse transform matrix can reduce the number of multiplication calculations by the R/N ratio (N×R).

A transform set configuration shown in Table 2 may also be applied to an 8×8 RST. That is, the 8×8 RST may be applied according to a transform set in Table 2. Since one transform set includes two or three transforms (kernels) according to an intra prediction mode, it may be configured to select one of up to four transforms including that in a case where no secondary transform is applied. In a transform where no secondary transform is applied, it may be considered to apply an identity matrix. Assuming that indexes 0, 1, 2, and 3 are respectively assigned to the four transforms (e.g., index 0 may be allocated to a case where an identity matrix is applied, that is, a case where no secondary transform is applied), a transform index or an lfnst index as a syntax element may be signaled for each transform coefficient block, thereby designating a transform to be applied. That is, for a top-left 8×8 block, through the transform index, it is possible to designate an 8×8 RST in an RST configuration, or to designate an 8×8 lfnst when the LFNST is applied. The 8×8 lfnst and the 8×8 RST refer to transforms applicable to an 8×8 region included in the transform coefficient block when both W and H of the target block to be transformed are equal to or greater than 8, and the 8×8 region may be a top-left 8×8 region in the transform coefficient block. Similarly, a 4×4 lfnst and a 4×4 RST refer to transforms applicable to a 4×4 region included in the transform coefficient block when both W and H of the target block to are equal to or greater than 4, and the 4×4 region may be a top-left 4×4 region in the transform coefficient block.

According to an embodiment of the present disclosure, for a transform in an encoding process, only 48 pieces of data may be selected and a maximum 16×48 transform kernel matrix may be applied thereto, rather than applying a 16×64 transform kernel matrix to 64 pieces of data forming an 8×8 region. Here, "maximum" means that m has a maximum value of 16 in an m×48 transform kernel matrix for generating m coefficients. That is, when an RST is performed by applying an m×48 transform kernel matrix (m≤16) to an 8×8 region, 48 pieces of data are input and m coefficients are generated. When m is 16, 48 pieces of data are input and 16 coefficients are generated. That is, assuming that 48 pieces of data form a 48×1 vector, a 16×48 matrix and a 48×1 vector are sequentially multiplied, thereby generating a 16×1 vector. Here, the 48 pieces of data forming the 8×8 region may be properly arranged, thereby forming the 48×1 vector. For example, a 48×1 vector may be constructed based on 48 pieces of data constituting a region excluding the bottom right 4×4 region among the 8×8 regions. Here, when a matrix operation is performed by applying a maximum 16×48 transform kernel matrix, 16 modified transform coefficients are generated, and the 16 modified transform coefficients may be arranged in a top-left 4×4 region according to a scanning order, and a top-right 4×4 region and a bottom-left 4×4 region may be filled with zeros.

For an inverse transform in a decoding process, the transposed matrix of the foregoing transform kernel matrix may be used. That is, when an inverse RST or LFNST is performed in the inverse transform process performed by the decoding apparatus, input coefficient data to which the inverse RST is applied is configured in a one-dimensional vector according to a predetermined arrangement order, and a modified coefficient vector obtained by multiplying the one-dimensional vector and a corresponding inverse RST matrix on the left of the one-dimensional vector may be arranged in a two-dimensional block according to a predetermined arrangement order.

In summary, in the transform process, when an RST or LFNST is applied to an 8×8 region, a matrix operation of 48 transform coefficients in top-left, top-right, and bottom-left regions of the 8×8 region excluding the bottom-right region among transform coefficients in the 8×8 region and a 16×48 transform kernel matrix. For the matrix operation, the 48 transform coefficients are input in a one-dimensional array. When the matrix operation is performed, 16 modified transform coefficients are derived, and the modified transform coefficients may be arranged in the top-left region of the 8×8 region.

On the contrary, in the inverse transform process, when an inverse RST or LFNST is applied to an 8×8 region, 16 transform coefficients corresponding to a top-left region of the 8×8 region among transform coefficients in the 8×8 region may be input in a one-dimensional array according to a scanning order and may be subjected to a matrix operation with a 48×16 transform kernel matrix. That is, the matrix operation may be expressed as (48×16 matrix)*(16×1 transform coefficient vector)=(48×1 modified transform coefficient vector). Here, an n×1 vector may be interpreted to have the same meaning as an n×1 matrix and may thus be expressed as an n×1 column vector. Further, * denotes matrix multiplication. When the matrix operation is performed, 48 modified transform coefficients may be derived, and the 48 modified transform coefficients may be arranged in top-left, top-right, and bottom-left regions of the 8×8 region excluding a bottom-right region.

When a secondary inverse transform is based on an RST, the inverse transformer 235 of the encoding apparatus 200 and the inverse transformer 322 of the decoding apparatus 300 may include an inverse reduced secondary transformer to derive modified transform coefficients based on an inverse RST on transform coefficients and an inverse primary transformer to derive residual samples for the target block based on an inverse primary transform on the modified transform coefficients. The inverse primary transform refers to the inverse transform of a primary transform applied to a residual. In the present disclosure, deriving a transform coefficient based on a transform may refer to deriving the transform coefficient by applying the transform.

The above-described non-separable transform, the LFNST, will be described in detail as follows. The LFNST may include a forward transform by the encoding apparatus and an inverse transform by the decoding apparatus.

The encoding apparatus receives a result (or a part of a result) derived after applying a primary (core) transform as an input, and applies a forward secondary transform (secondary transform).

$$y = G^T \qquad \text{[Equation 9]}$$

In Equation 9, x and y are inputs and outputs of the secondary transform, respectively, and G is a matrix representing the secondary transform, and transform basis vectors are composed of column vectors. In the case of an inverse LFNST, when the dimension of the transformation matrix G is expressed as [number of rows×number of columns], in the case of an forward LFNST, the transposition of matrix G becomes the dimension of GT.

For the inverse LFNST, the dimensions of matrix G are [48×16], [48×8], [16×16], [16×8], and the [48×8] matrix and the [16×8] matrix are partial matrices that sampled 8 transform basis vectors from the left of the [48×16] matrix and the [16×16] matrix, respectively.

On the other hand, for the forward LFNST, the dimensions of matrix GT are [16×48], [8×48], [16×16], [8×16], and the [8×48] matrix and the [8×16] matrix are partial matrices obtained by sampling 8 transform basis vectors from the top of the [16×48] matrix and the [16×16] matrix, respectively.

Therefore, in the case of the forward LFNST, a [48×1] vector or [16×1] vector is possible as an input x, and a [16×1] vector or a [8×1] vector is possible as an output y. In video coding and decoding, the output of the forward primary transform is two-dimensional (2D) data, so to construct the [48×1] vector or the [16×1] vector as the input x, a one-dimensional vector must be constructed by properly arranging the 2D data that is the output of the forward transformation.

Figure 7:
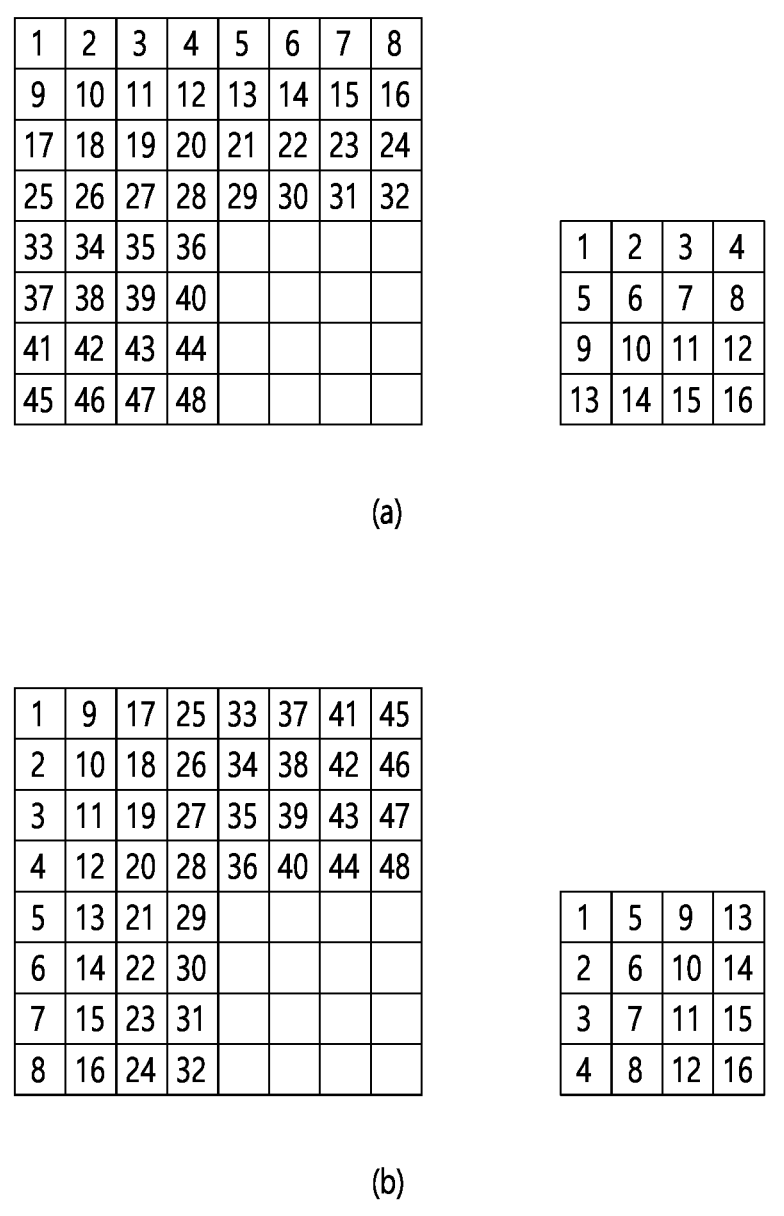

FIG. 7 is a diagram illustrating a sequence of arranging output data of a forward primary transformation into a one-dimensional vector according to an example. The left diagrams of (a) and (b) of FIG. 7 show the sequence for constructing a [48×1] vector, and the right diagrams of (a) and (b) of FIG. 7 shows the sequence for constructing a [16×1] vector. In the case of the LFNST, a one-dimensional vector x can be obtained by sequentially arranging 2D data in the same order as in (a) and (b) of FIG. 7.

The arrangement direction of the output data of the forward primary transform may be determined according to an intra prediction mode of the current block. For example, when the intra prediction mode of the current block is in the horizontal direction with respect to the diagonal direction, the output data of the forward primary transform may be arranged in the order of (a) of FIG. 7, and when the intra prediction mode of the current block is in the vertical direction with respect to the diagonal direction, the output data of the forward primary transform may be arranged in the order of (b) of FIG. 7.

According to an example, an arrangement order different from the arrangement orders of (a) and (b) FIG. 7 may be applied, and in order to derive the same result (y vector) as when the arrangement orders of (a) and (b) FIG. 7 is applied, the column vectors of the matrix G may be rearranged according to the arrangement order. That is, it is possible to rearrange the column vectors of G so that each element constituting the x vector is always multiplied by the same transform basis vector.

Since the output y derived through Equation 9 is a one-dimensional vector, when two-dimensional data is required as input data in the process of using the result of the forward secondary transformation as an input, for example, in the process of performing quantization or residual coding, the output y vector of Equation 9 must be properly arranged as 2D data again.

Figure 8:
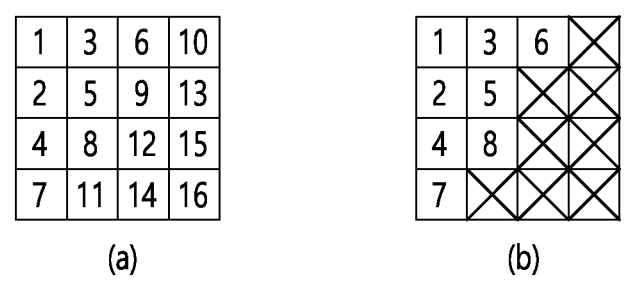

FIG. 8 is a diagram illustrating a sequence of arranging output data of a forward secondary transform into a two-dimensional block according to an example.

In the case of the LFNST, output values may be arranged in a 2D block according to a predetermined scan order. (a) of FIG. 8 shows that when the output y is a [16×1] vector, the output values are arranged at 16 positions of the 2D block according to a diagonal scan order. (b) of FIG. 8 shows that when the output y is a [8×1] vector, the output values are arranged at 8 positions of the 2D block according to the diagonal scan order, and the remaining 8 positions are filled with zeros. X in (b) of FIG. 8 indicates that it is filled with zero.

According to another example, since the order in which the output vector y is processed in performing quantization or residual coding may be preset, the output vector y may not be arranged in the 2D block as shown in FIG. 8. However, in the case of the residual coding, data coding may be performed in 2D block (eg, 4×4) units such as CG (Coefficient Group), and in this case, the data are arranged according to a specific order as in the diagonal scan order of FIG. 8.

Meanwhile, the decoding apparatus may configure the one-dimensional input vector y by arranging two-dimensional data output through a dequantization process or the like according to a preset scan order for the inverse transformation. The input vector y may be output as the output vector x by the following equation.

$$x = Gy \quad \text{[Equation 10]}$$

In the case of the inverse LFNST, an output vector x can be derived by multiplying an input vector y, which is a [16×1] vector or a [8×1] vector, by a G matrix. For the inverse LFNST, the output vector x can be either a [48×1] vector or a [16×1] vector.

The output vector x is arranged in a two-dimensional block according to the order shown in FIG. 7 and is arranged as two-dimensional data, and this two-dimensional data becomes input data (or a part of input data) of the inverse primary transformation.

Accordingly, the inverse secondary transformation is the opposite of the forward secondary transform process as a whole, and in the case of the inverse transformation, unlike in the forward direction, the inverse secondary transformation is first applied, and then the inverse primary transformation is applied.

In the inverse LFNST, one of 8 48×16 matrices and 8 16×16 matrices may be selected as the transformation matrix G. Whether to apply the 48×16 matrix or the 16×16 matrix depends on the size and shape of the block.

In addition, 8 matrices may be derived from four transform sets as shown in Table 2 above, and each transform set may consist of two matrices. Which transform set to use among the 4 transform sets is determined according to the intra prediction mode, and more specifically, the transform set is determined based on the value of the intra prediction mode extended by considering the Wide Angle Intra Prediction (WAIP). Which matrix to select from among the two matrices constituting the selected transform set is derived through index signaling. More specifically, 0, 1, and 2 are possible as the transmitted index value, 0 may indicate that the LFNST is not applied, and 1 and 2 may indicate any one of two transform matrices constituting a transform set selected based on the intra prediction mode value.

Figure 9:
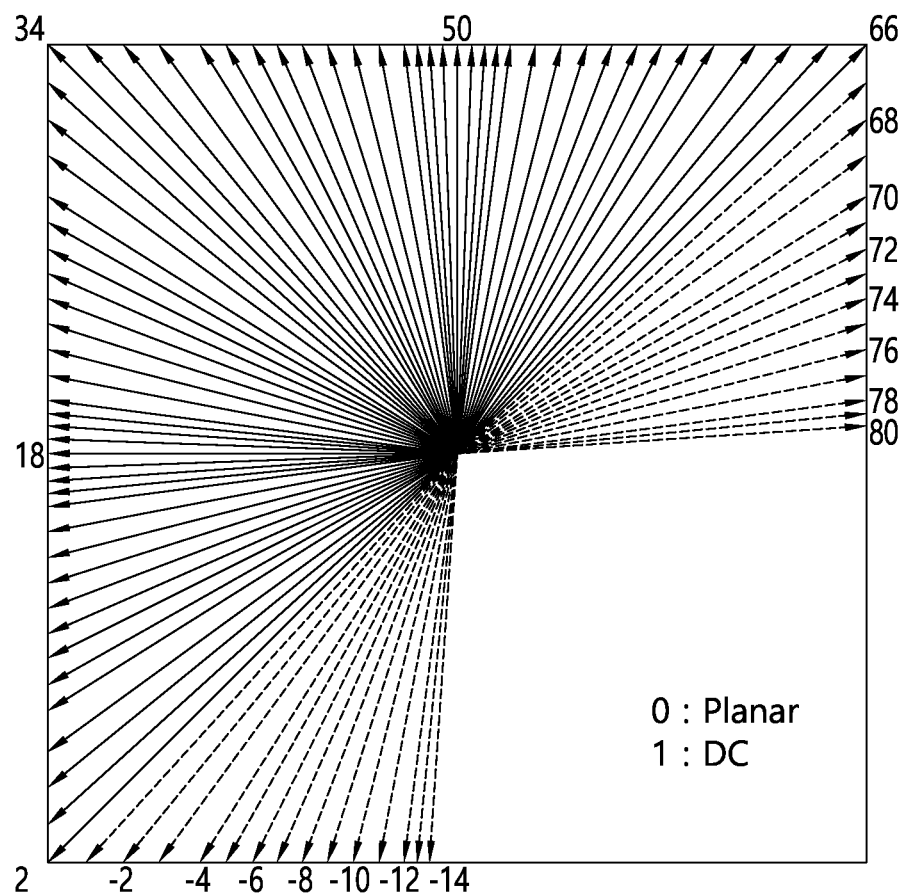
FIG. 9 is a diagram illustrating wide-angle intra prediction modes according to an embodiment of the present document.

FIG. 9 is a diagram illustrating wide-angle intra prediction modes according to an embodiment of the present document.

The general intra prediction mode value may have values from 0 to 66 and 81 to 83, and the intra prediction mode value extended due to WAIP may have a value from −14 to 83 as shown. Values from 81 to 83 indicate the CCLM (Cross Component Linear Model) mode, and values from −14 to −1 and values from 67 to 80 indicate the intra prediction mode extended due to the WAIP application.

When the width of the prediction current block is greater than the height, the upper reference pixels are generally closer to positions inside the block to be predicted. Therefore, it may be more accurate to predict in the bottom-left direction than in the top-right direction. Conversely, when the height of the block is greater than the width, the left reference pixels are generally close to positions inside the block to be predicted. Therefore, it may be more accurate to predict in the top-right direction than in the bottom-left direction. Therefore, it may be advantageous to apply remapping, ie, mode index modification, to the index of the wide-angle intra prediction mode.

When the wide-angle intra prediction is applied, information on the existing intra prediction may be signaled, and after the information is parsed, the information may be remapped to the index of the wide-angle intra prediction mode. Therefore, the total number of the intra prediction modes for a specific block (eg, a non-square block of a specific size) may not change, and that is, the total number of the intra prediction modes is 67, and intra prediction mode coding for the specific block may not be changed.

Table 3 below shows a process of deriving a modified intra mode by remapping the intra prediction mode to the wide-angle intra prediction mode.

TABLE 3

Inputs to this process are:
- a variable predModeIntra specifying the intra prediction mode,
- a variable nTbW specifying the transform block width,
- a variable nTbH specifying the transform block height,
- a variable cIdx specifying the colour component of the current block.
Output of this process is the modified intra prediction mode predModeIntra.
The variables nW and nH are derived as follows:
- If IntraSubPartitionsSplitType is equal to ISP_NO_SPLIT or cIdx is not equal to 0, the following applies:
   nW = nTbw   (8-97)
   nH = nTbH   (8-98)
- Otherwise ( IntraSubPartitionsSplitType is not equal to ISP_NO_SPLIT and cIdx is equal to 0 ), the following applies:
   nW = nCbW   (8-99)
   nH = nCbH   (8-100)
The variable whRatio is set equal to Abs( Log2( nW / nH ) ).
For non-square blocks (nW is not equal to nH), the intra prediction mode predModeIntra is modified as follows:
- If all of the following conditions are true, predModeIntra is set equal to ( predModeIntra + 65 ).
  - nW is greater than nH
  - predModeIntra is greater than or equal to 2
  - predModeIntra is less than ( whRatio > 1 ) ? ( 8 + 2 * whRatio ) : 8
- Otherwise, if all of the following conditions are true, predModeIntra is set equal to ( predModeIntra − 67 ).
  - nH is greater than nW
  - predModeIntra is less than or equal to 66
  - predModeIntra is greater than ( whRatio > 1 ) ? ( 60 − 2 * whRatio ) 3 : 60

In Table 3, the extended intra prediction mode value is finally stored in the predModeIntra variable, and ISP_NO_SPLIT indicates that the CU block is not divided into sub-partitions by the Intra Sub Partitions (ISP) technique currently adopted in the VVC standard, and the cIdx variable Values of 0, 1, and 2 indicate the case of luma, Cb, and Cr components, respectively. Log 2 function shown in Table 3 returns a log value with a base of 2, and the Abs function returns an absolute value.

Variable predModeIntra indicating the intra prediction mode and the height and width of the transform block, etc. are used as input values of the wide angle intra prediction mode mapping process, and the output value is the modified intra prediction mode predModeIntra. The height and width of the transform block or the coding block may be the height and width of the current block for remapping of the intra prediction mode. At this time, the variable whRatio reflecting the ratio of the width to the width may be set to Abs(Log 2(nW/nH)).

For a non-square block, the intra prediction mode may be divided into two cases and modified.

First, if all conditions (1)~(3) are satisfied, (1) the width of the current block is greater than the height, (2) the intra prediction mode before modifying is equal to or greater than 2, (3) the intra prediction mode is less than the value derived from (8+2*whRatio) when the variable whRatio is greater than 1, and is less than 8 when the variable whRatio is less than or equal to 1 [predModeIntra is less than (whRatio>1) ?(8+2*whRatio):8], the intra prediction mode is set to a value 65 greater than the intra prediction mode [predModeIntra is set equal to (predModeIntra+65)].

If different from the above, that is, follow conditions (1)~(3) are satisfied, (1) the height of the current block is greater than the width, (2) the intra prediction mode before modifying is less than or equal to 66, (3) the intra prediction mode is greater than the value derived from (60−2*whRatio) when the variable whRatio is greater than 1, and is greater than 60 when the variable whRatio is less than or equal to 1 [predModeIntra is greater than (whRatio>1)?(60−2*whRatio): 60], the intra prediction mode is set to a value 67 smaller than the intra prediction mode [predModeIntra is set equal to (predModeIntra—67)].

Table 2 above shows how a transform set is selected based on the intra prediction mode value extended by the WAIP in the LFNST. As shown in FIG. 9, modes 14 to 33 and modes 35 to 80 are symmetric with respect to the prediction direction around mode 34. For example, mode 14 and mode 54 are symmetric with respect to the direction corresponding to mode 34. Therefore, the same transform set is applied to modes located in mutually symmetrical directions, and this symmetry is also reflected in Table 2.

Meanwhile, it is assumed that forward LFNST input data for mode 54 is symmetrical with the forward LFNST input data for mode 14. For example, for mode 14 and mode 54, the two-dimensional data is rearranged into one-dimensional data according to the arrangement order shown in (a) of FIG. 7 and (b) of FIG. 7, respectively. In addition, it can be seen that the patterns in the order shown in (a) of FIG. 7 and (b) of FIG. 7 are symmetrical with respect to the direction (diagonal direction) indicated by Mode 34.

Meanwhile, as described above, which transform matrix of the [48×16] matrix and the [16×16] matrix is applied to the LFNST is determined by the size and shape of the transform target block.

Figure 10:
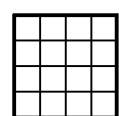
FIG. 10 is a diagram illustrating a block shape to which LFNST is applied.
Figure 10:
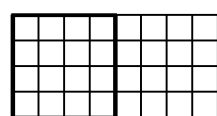
Figure 10:
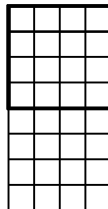
Figure 10:
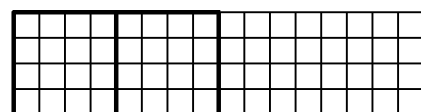
Figure 10:
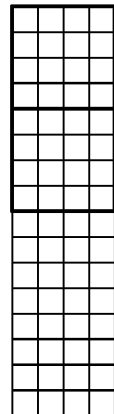
Figure 10:
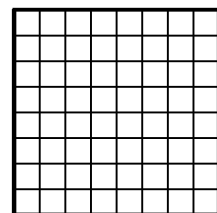
Figure 10:
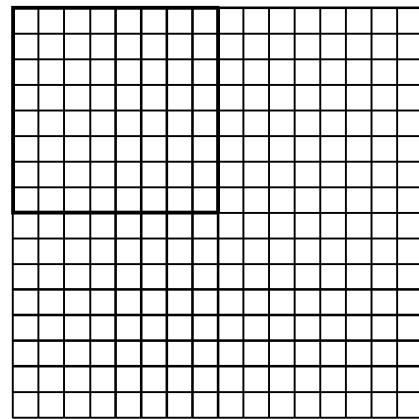

FIG. 10 is a diagram illustrating a block shape to which the LFNST is applied. (a) of FIG. 10 shows 4×4 blocks, (b) shows 4×8 and 8×4 blocks, (c) shows 4×N or N×4 blocks in which N is 16 or more, (d) shows 8×8 blocks, (e) shows M×N blocks where M>8, N≥8, and N>8 or M>8.

In FIG. 10, blocks with thick borders indicate regions to which the LFNST is applied. For the blocks of FIGS. 10 (a) and (b), the LFNST is applied to the top-left 4×4 region, and for the block of FIG. 10 (c), the LFNST is applied individually the two top-left 4×4 regions are continuously arranged. In (a), (b), and (c) of FIG. 10, since the LFNST is applied in units of 4×4 regions, this LFNST will be hereinafter referred to as "4×4 LFNST". As a corresponding transformation matrix, a [16×16] or [16×8] matrix may be applied based on the matrix dimension for G in Equations 9 and 10.

More specifically, the [16×8] matrix is applied to the 4×4 block (4×4 TU or 4×4 CU) of FIG. 10 (a) and the [16×16] matrix is applied to the blocks in (b) and (c) of FIG. 10. This is to adjust the computational complexity for the worst case to 8 multiplications per sample.

With respect to (d) and (e) of FIG. 10, the LFNST is applied to the top-left 8×8 region, and this LFNST is hereinafter referred to as "8×8 LFNST". As a corresponding transformation matrix, a [48×16] matrix or [48×8] matrix may be applied. In the case of the forward LFNST, since the [48×1] vector (x vector in Equation 9) is input as input data, all sample values of the top-left 8×8 region are not used as input values of the forward LFNST. That is, as can be seen in the left order of FIG. 7 (a) or the left order of FIG. 7 (b), the [48×1] vector may be constructed based on samples belonging to the remaining 3 4×4 blocks while leaving the bottom-right 4×4 block as it is.

The [48×8] matrix may be applied to an 8×8 block (8×8 TU or 8×8 CU) in FIG. 10 (d), and the [48×16] matrix may be applied to the 8×8 block in FIG. 10(e). This is also to adjust the computational complexity for the worst case to 8 multiplications per sample.

Depending on the block shape, when the corresponding forward LFNST (4×4 LFNST or 8×8 LFNST) is applied, 8 or 16 output data (y vector in Equation 9, [8×1] or [16×1] vector) is generated. In the forward LFNST, the number of output data is equal to or less than the number of input data due to the characteristics of the matrix GT.

Figure 11:
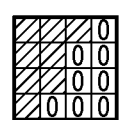
FIG. 11 is a diagram illustrating an arrangement of output data of a forward LFNST according to an example.
Figure 11:
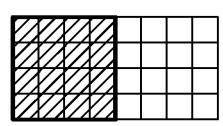
Figure 11:
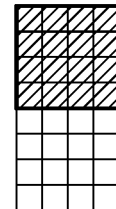
Figure 11:
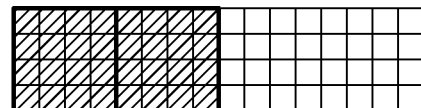
Figure 11:
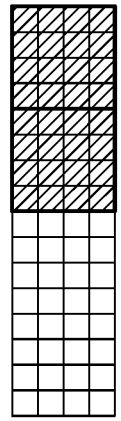
Figure 11:
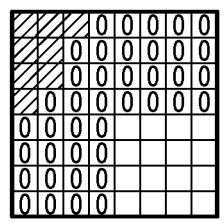
Figure 11:
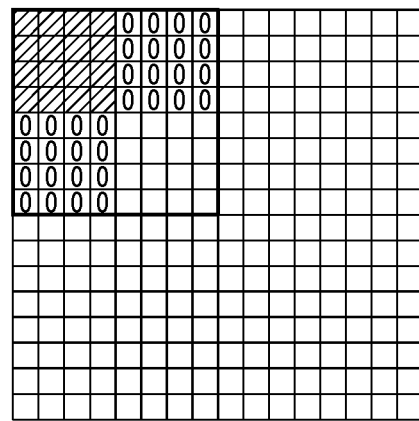

FIG. 11 is a diagram illustrating an arrangement of output data of a forward LFNST according to an example, and shows a block in which output data of the forward LFNST is arranged according to a block shape.

The shaded area at the top-left of the block shown in FIG. 11 corresponds to the area where the output data of the forward LFNST is located, the positions marked with 0 indicate samples filled with 0 values, and the remaining area represents regions that are not changed by the forward LFNST. In the area not changed by the LFNST, the output data of the forward primary transform remains unchanged.

As described above, since the dimension of the transform matrix applied varies according to the shape of the block, the number of output data also varies. As FIG. 11, the output data of the forward LFNST may not completely fill the top-left 4×4 block. In the case of (a) and (d) of FIG. 11, a [16×8] matrix and a [48×8] matrix are applied to the block indicated by a thick line or a partial region inside the block, respectively, and a [8×1] vector as the output of the forward LFNST is generated. That is, according to the scan order shown in (b) of FIG. 8, only 8 output data may be filled as shown in (a) and (d) of FIG. 11, and 0 may be filled in the remaining 8 positions. In the case of the LFNST applied block of FIG. 10 (d), as shown in FIG. 11(d), two 4×4 blocks in the top-right and bottom-left adjacent to the top-left 4×4 block are also filled with 0 values.

As described above, basically, by signaling the LFNST index, whether to apply the LFNST and the transform matrix to be applied are specified. As shown FIG. 11, when the LFNST is applied, since the number of output data of the forward LFNST may be equal to or less than the number of input data, a region filled with a zero value occurs as follows.

1) As shown in (a) of FIG. 11, samples from the 8th and later positions in the scan order in the top-left 4×4 block, that is, samples from the 9th to the 16th.

2) As shown in (d) and (e) of FIG. 11, when the [16×48] matrix or the [8×48] matrix is applied, two 4×4 blocks adjacent to the top-left 4×4 block or the second and third 4×4 blocks in the scan order.

Therefore, if non-zero data exists by checking the areas 1) and 2), it is certain that the LFNST is not applied, so that the signaling of the corresponding LFNST index can be omitted.

Meanwhile, for the adopted LFNST, the following simplification methods may be applied.

(i) According to an example, the number of output data for the forward LFNST may be limited to a maximum of 16.

In the case of (c) of FIG. 10, the 4×4 LFNST may be applied to two 4×4 regions adjacent to the top-left, respectively, and in this case, a maximum of 32 LFNST output data may be generated. when the number of output data for forward LFNST is limited to a maximum of 16, in the case of 4×N/N×4 (N>16) blocks (TU or CU), the 4×4 LFNST is only applied to one 4×4 region in the top-left, the LFNST may be applied only once to all blocks of FIG. 10. Through this, the implementation of image coding may be simplified.

Figure 12:
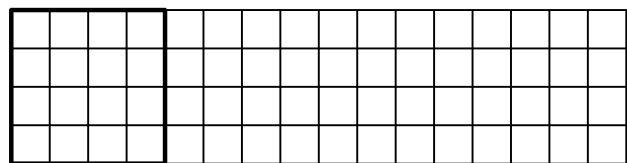
FIG. 12 is a diagram illustrating that the number of output data for a forward LFNST is limited to a maximum of 16 according to an example.
Figure 12:
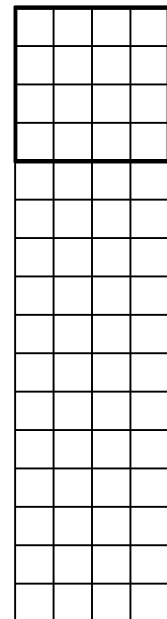

FIG. 12 shows that the number of output data for the forward LFNST is limited to a maximum of 16 according to an example. As FIG. 12, when the LFNST is applied to the most top-left 4×4 region in a 4×N or N×4 block in which N is 16 or more, the output data of the forward LFNST becomes 16 pieces.

(ii) According to an example, zero-out may be additionally applied to a region to which the LFNST is not applied. In this document, the zero-out may mean filling values of all positions belonging to a specific region with a value of 0. That is, the zero-out can be applied to a region that is not changed due to the LFNST and maintains the result of the forward primary transformation. As described above, since the LFNST is divided into the 4×4 LFNST and the 8×8 LFNST, the zero-out can be divided into two types ((ii)-(A) and (ii)-(B)) as follows.

Figure 13:
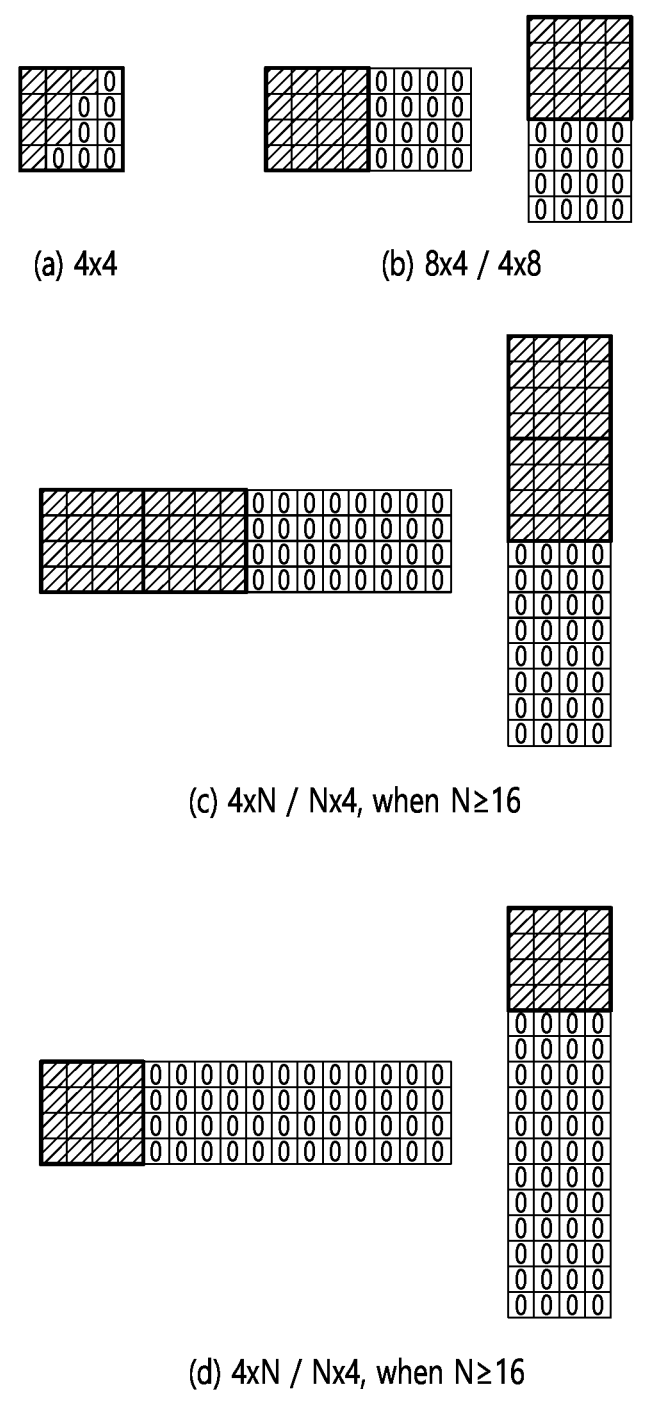

(ii)-(A) When the 4×4 LFNST is applied, a region to which the 4×4 LFNST is not applied may be zeroed out. FIG. 13 is a diagram illustrating the zero-out in a block to which the 4×4 LFNST is applied according to an example.

As shown in FIG. 13, with respect to a block to which the 4×4 LFNST is applied, that is, for all of the blocks in (a), (b) and (c) of FIG. 11, the whole region to which the LFNST is not applied may be filled with zeros.

On the other hand, (d) of FIG. 13 shows that when the maximum value of the number of the output data of the forward LFNST is limited to 16 as shown in FIG. 12, the zero-out is performed on the remaining blocks to which the 4×4 LFNST is not applied.

Figure 14:
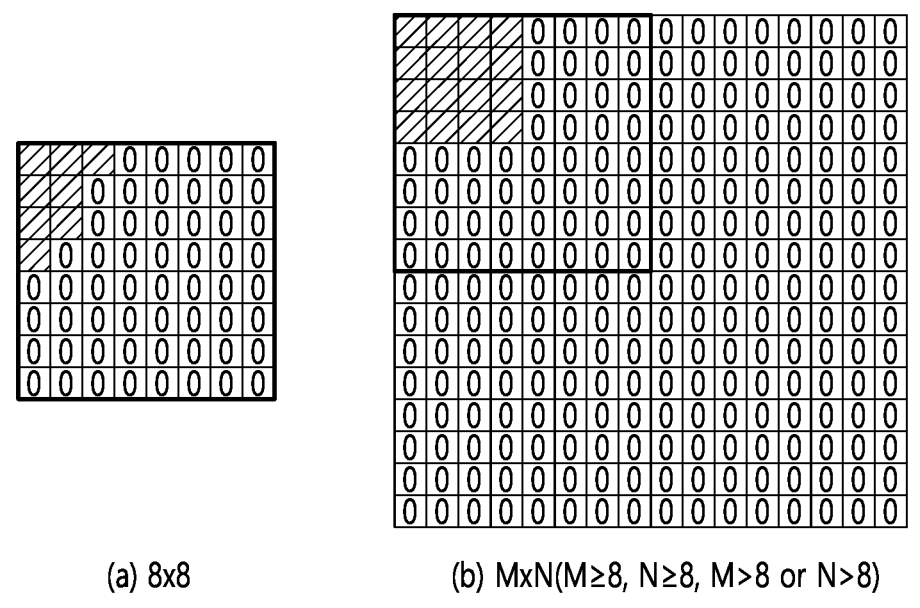

(ii)-(B) When the 8×8 LFNST is applied, a region to which the 8×8 LFNST is not applied may be zeroed out. FIG. 14 is a diagram illustrating the zero-out in a block to which the 8×8 LFNST is applied according to an example.

As shown in FIG. 14, with respect to a block to which the 8×8 LFNST is applied, that is, for all of the blocks in (d) and (e) of FIG. 11, the whole region to which the LFNST is not applied may be filled with zeros.

(iii) Due to the zero-out presented in (ii) above, the area filled with zeros may be not same when the LFNST is applied. Accordingly, it is possible to check whether the non-zero data exists according to the zero-out proposed in (ii) over a wider area than the case of the LFNST of FIG. 11.

For example, when (ii)-(B) is applied, after checking whether the non-zero data exists where the area filled with zero values in (d) and (e) of FIG. 11 in addition to the area filled with 0 additionally in FIG. 14, signaling for the LFNST index can be performed only when the non-zero data does not exist.

Of course, even if the zero-out proposed in (ii) is applied, it is possible to check whether the non-zero data exists in the same way as the existing LFNST index signaling. That is, after checking whether the non-zero data exists in the block filled with zeros in FIG. 11, the LFNST index signaling may be applied. In this case, the encoding apparatus only performs the zero out and the decoding apparatus does not assume the zero out, that is, checking only whether the non-zero data exists only in the area explicitly marked as 0 in FIG. 11, may perform the LFNST index parsing.

Various embodiments in which combinations of the simplification methods ((i), (ii)-(A), (ii)-(B), (iii)) for the LFNST are applied may be derived. Of course, the combinations of the above simplification methods are not limited to the following embodiments, and any combination may be applied to the LFNST.

Embodiment

Limit the number of output data for forward LFNST to a maximum of 16→(i)
When the 4×4 LFNST is applied, all areas to which the 4×4 LFNST is not applied are zero-out→(ii)-(A)
When the 8×8 LFNST is applied, all areas to which the 8×8 LFNST is not applied are zero-out→(ii)-(B)
After checking whether the non-zero data exists also the existing area filled with zero value and the area filled with zeros due to additional zero outs ((ii)-(A), (ii)-(B)), the LFNST index is signaled only when the non-zero data does not exist→(iii)

In the case of Embodiment, when the LFNST is applied, an area in which the non-zero output data can exist is limited to the inside of the top-left 4×4 area. In more detail, in the case of FIG. 13 (a) and FIG. 14 (a), the 8th position in the scan order is the last position where non-zero data can exist. In the case of FIGS. 13 (b) and (c) and FIG. 14 (b), the 16th position in the scan order (ie, the position of the bottom-right edge of the top-left 4×4 block) is the last position where data other than 0 may exist.

Therefore, when the LFNST is applied, after checking whether the non-zero data exists in a position where the residual coding process is not allowed (at a position beyond the last position), it can be determined whether the LFNST index is signaled.

In the case of the zero-out method proposed in (ii), since the number of data finally generated when both the primary transform and the LFNST are applied, the amount of computation required to perform the entire transform process can be reduced. That is, when the LFNST is applied, since zero-out is applied to the forward primary transform output data existing in a region to which the LFNST is not applied, there is no need to generate data for the region that become zero-out during performing the forward primary transform. Accordingly, it is possible to reduce the amount of computation required to generate the corresponding data. The additional effects of the zero-out method proposed in (ii) are summarized as follows.

First, as described above, the amount of computation required to perform the entire transform process is reduced.

In particular, when (ii)-(B) is applied, the amount of calculation for the worst case is reduced, so that the transform process can be lightened. In other words, in general, a large amount of computation is required to perform a large-size primary transformation. By applying (ii)-(B), the number of data derived as a result of performing the forward LFNST can be reduced to 16 or less. In addition, as the size of the entire block (TU or CU) increases, the effect of reducing the amount of transform operation is further increased.

Second, the amount of computation required for the entire transform process can be reduced, thereby reducing the power consumption required to perform the transform.

Third, the latency involved in the transform process is reduced.

The secondary transformation such as the LFNST adds a computational amount to the existing primary transformation, thus increasing the overall delay time involved in performing the transformation. In particular, in the case of intra prediction, since reconstructed data of neighboring blocks is used in the prediction process, during encoding, an increase in latency due to a secondary transformation leads to an increase in latency until reconstruction. This can lead to an increase in overall latency of intra prediction encoding.

However, if the zero-out suggested in (ii) is applied, the delay time of performing the primary transform can be greatly reduced when LFNST is applied, the delay time for the entire transform is maintained or reduced, so that the encoding apparatus can be implemented more simply.

Meanwhile, in the conventional intra prediction, a coding target block is regarded as one coding unit, and coding is performed without partition thereof. However, the ISP (Intra Sub-Partitions) coding refers to performing the intra prediction coding with the coding target block being partitioned in a horizontal direction or a vertical direction. In this case, a reconstructed block may be generated by performing encoding/decoding in units of partitioned blocks, and the reconstructed block may be used as a reference block of the next partitioned block. According to an example, in the ISP coding, one coding block may be partitioned into two or four sub-blocks and be coded, and in the ISP, intra prediction is performed on one sub-block by referring to the reconstructed pixel value of a sub-block located adjacent to the left or top side thereof. Hereinafter, the term "coding" may be used as a concept including both coding performed by the encoding apparatus and decoding performed by the decoding apparatus.

Hereinafter, an embodiment of applying an LFNST only to a luma component in a single tree is described.

A coding unit syntax table related to signaling of an LFNST index and an MTS index according to an example is shown as below.

TABLE 4

LfnstDcOnly = 1
LfnstZeroOutSigCoeffFlag = 1
MtsZeroOutSigCoeffFlag = 1
transform_tree( x0, y0, cbWidth, cbHeight, treeType, chType )
lfnstWidth = ( treeType = = DUAL_TREE_CHROMA ) ? cbWidth / SubWidthC
    : ( ( IntraSubPartitionsSplitType = = ISP_VER_SPLIT ) ? cbWidth /
      NumIntraSubPartitions : cbWidth )

TABLE 4-continued

```
lfnstHeight = ( treeType = = DUAL_TREE_CHROMA ) ? cbHeight / SubHeightC
              : ( ( IntraSubPartitionsSplitType = = ISP_HOR_SPLIT ) ? cbHeight /
                NumIntraSubPartitions : cbHeight )
if( Min( lfnstWidth, lfnstHeight ) >= 4 && sps_lfnst_enabled_flag = = 1
&&
    CuPredMode[ chType ][ x0 ][ y0 ] = = MODE_INTRA &&
    transform_skip_flag[ x0 ][ y0 ][ 0 ] = = 0 &&
    ( treeType != DUAL_TREE_CHROMA || !intra_mip_flag[ x0 ][ y0 ] ||
      Min( lfnstWidth, lfnstHeight ) >= 16 ) &&
    Max( cbWidth, cbHeight ) <= MaxTbSizeY) {
    if( ( IntraSubPartitionsSplitType != ISP_NO_SPLIT || LfnstDcOnly = =
0 ) &&
      LfnstZeroOutSigCoeffFlag = = 1 )
      lfnst_idx                                                              ae(v)
}
```

The meanings of major variables in the above table are as follows.

1. cbWidth, cbHeight: Width and height of a current coding block
2. log 2TbWidth, log 2TbHeight: Base-2 logarithm values of the width and height of a current transform block. The size of the current transform block may be reduced to a top-left region in which a non-zero coefficient may exist by applying a zero-out.
3. sps_lfnst_enabled_flag: Flag indicating whether an LFNST is enabled. The value of the flag equal to 0 indicates that the LFNST is not enabled, and the value of the flag equal to 1 indicates that the LFNST is enabled. The flag is defined in a sequence parameter set (SPS).
4. CuPredMode[chType][x0][y0]: Prediction mode corresponding to a variable chType and a position of (x0, y0). chType may have values of 0 and 1, where 0 represents a luma component and 1 represents a chroma component. The position of (x0, y0) indicates a position on a picture, and MODE_INTRA (intra prediction) and MODE_INTER (inter prediction) are possible with the value of CuPredMode[chType][x0][y0].
5. IntraSubPartitionsSplitType: Indicates which ISP is applied to a current coding unit, and ISP_NO_SPLIT indicates that the coding unit is not split into partition blocks.
6. intra_mip_flag[x0][y0]: The position of (x0, y0) is described as above in 4. intra_mip_flag is a flag indicating whether a matrix-based intra prediction (MIP) mode is applied. The value of the flag equal to 0 indicates that MIP is not applicable, and the value of the flag equal to 1 indicates that MIP is applied.
7. cIdx: A value of 0 indicates luma, and values of 1 and 2 indicate chroma components Cb and Cr, respectively.
8. treeType: Indicates a singletree, a dual-tree, or the like. (SINGLE_TREE: Single tree, DUAL_TREE_LUMA: Dual tree for luma component, DUAL_TREE_CHROMA: Dual tree for chroma component)
9. lfnst_idx[x0][y0]: LFNST index syntax element to be parsed. If not parsed, the element is inferred to have a value of 0. That is, a default value is set to 0, which indicates that no LFNST is applied.

The description of the foregoing syntax elements may be applied to syntax elements shown in the following tables.

In Table 4, transform_skip_flag[x0][y0][0]==0 is one condition for determining whether an lfnst index is signaled with respect to a luma component according to whether a transform is skipped.

Accordingly, according to an example, the following coding unit syntax table is proposed in order to remove dependence between signaling of a transform skip flag for a luma component and signaling of an LFNST index for a chroma component.

TABLE 5

```
LfnstDcOnly = 1
LfnstZeroOutSigCoeffFlag = 1
MtsZeroOutSigCoeffFlag = 1
transform_tree( x0, y0, cbWidth, cbHeight, treeType, chType )
lfnstWidth = ( treeType = = DUAL_TREE_CHROMA ) ? cbWidth / SubWidthC
            : ( ( IntraSubPartitionsSplitType = = ISP_VER_SPLIT ) ? cbWidth
/
              NumIntraSubPartitions : cbWidth )
lfnstHeight = ( treeType = = DUAL_TREE_CHROMA ) ? cbHeight / SubHeightC
            : ( ( IntraSubPartitionsSplitType = =
ISP_HOR_SPLIT) ? cbHeight /
              NumIntraSubPartitions : cbHeight )
            LfnstTransformNotSkipFlag = ( treeType != DUAL_TREE_CHROMA ?
              transform_skip_flag[ x0 ][ y0 ][ 0 ] = = 0 :
( transform_skip_flag[ x0 ][ y0 ][ 1 ] = = 0 ||
      transform_skip_flag[ x0 ][ y0 ][ 2 ] = = 0 ))
    if( Min( lfnstWidth, lfnstHeight ) >= 4 && sps_lfnst_enabled_flag = = 1
&&
      CuPredMode[ chType ][ x0 ][ y0 ] = = MODE_INTRA &&
      LfnstTransformNotSkipFlag &&
      ( treeType != DUAL_TREE_CHROMA || ( !intra_mip_flag[ x0 ][ y0 ] ||
        Min( lfnstWidth, lfnstHeight ) >= 16 ) ) &&
      Max( cbWidth, cbHeight ) <= MaxTbSizeY) {
      if( ( IntraSubPartitionsSplitType != ISP_NO_SPLIT || LfnstDcOnly = =
0 ) &&
```

TABLE 5-continued

```
    LfnstZeroOutSigCoeffFlag = = 1 )
        lfnst_idx                                                          ae(v)
}
```

In an embodiment shown in Table 5, signaling of an LFNST index for a luma component depends only on a transform skip flag for a luma component for both a dual-tree type and a single-tree partition mode. In a dual-tree mode, the LFNST index for a chroma component may be signaled depending only on a transform skip flag for a chroma component. In the single-tree partition mode, an LFNST is not applied to a chroma component in order to reduce a delay for the worst case.

A variable LfnstTransformNotSkipFlag shown in Table 5 is set according to the tree type of a current block and a transform skip flag value for a color component, and only when the value of the variable is 1, an LFNST index may be signaled.

When the tree type is not a dual-tree chroma (treeType !=DUAL_TREE_CHROMA), that is, when the tree type is a singletree or a dual-tree luma, if a transform skip flag value for a luma component is 0, the variable LfnstTransformNotSkipFlag may be set to 1 (tree Type !=DUAL_ TREE_CHROMA? transform_skip_flag [x0][y0][0]==0: (transform_skip_flag[x0][y0][1]==0||transform_skip_flag[x0][y0][2]==0)), and when the tree type is the dual-tree chroma, if a transform skip flag value (transform_skip_flag[x0][y0][1]) for a chroma component Cr is 0 or a transform skip flag value (transform_skip_flag[x0][y0][1]) for a chroma component Cr is 0, the variable Lfnst-TransformNotSkipFlag may be set to 1 (treeType !=DUAL_ TREE_CHROMA ? transform_skip_flag[x0][y0][0]==0: (transform_skip_flag[x0][y0][1]==0||transform_skip_flag [x0][y0][2]==0)).

In present disclosure, an operator "x?y: z" indicates that x is y if x is TRUE and x is z otherwise (if x is TRUE, evaluates to the value of y; otherwise, evaluates to the value of z).

Specification text for a transform process considering Table 5 is as follows.

TABLE 6

```
8.7.4 Transformation process for scaled transform coefficients
8.7.4.1 General
Inputs to this process are:
- a luma location ( xTbY, yTbY ) specifying the top-left sample of the current luma transform block relative to
  the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1, y = 0..nTbH − 1.
Output of this process is the (nTbW)x(nTbH) array res[ x ][ y ] of residual samples with x = 0..nTbW − 1,
y = 0..nTbH − 1.
The variable applyLfnstFlag is derived as follows:
- If treeType is equal to SINGLE_TREE and lfnst_idx is not equal to 0 and
  transform_skip_flag[ xTbY ][ yTbY ][ cIdx ] is equal to 0 and cIdx is equal to 0 and both nTbW and nTbH
  are greater than or equal to 4, applyLfnstFlag is set to 1.
- Otherwise, if treeType is not equal to SINGLE_TREE and lfnst_idx is not equal to 0 and
  transform_skip_flag[ xTbY ][ yTbY ][ cIdx ] is equal to 0 and both nTbW and nTbH are greater than or equal
  to 4, applyLfnstFlag is set to 1.
- Otherwise, applyLfnstFlag is set to 0.
When applyLfnstFlag is equal to 1, the follwing applies:
- The variables predModeIntra, nLfnstOutSize, log2LfnstSize, nLfnstSize, and nonZeroSize are derived as
  follows:
    predModeIntra =
    ( cIdx = = 0 ) ? IntraPredModeY[ xTbY ][ yTbY ] : IntraPredModeC[ xTbY ][ yTbY ]      (1149)
    nLfnstOutSize = ( nTbW >= 8 && nTbH >= 8 ) ? 48 : 16                                   (1150)
    log2LfnstSize = ( nTbW >= 8 && nTbH >= 8 ) ? 3 : 2                                     (1151)
    nLfnstSize = 1 << log2LfnstSize                                                        (1152)
    nonZeroSize = ( ( nTbW = = 4 && nTbH = = 4 ) ||
    ( nTbW = = 8 && nTbH = = 8 ) ) ? 8 : 16                                                (1153)
...
```

A variable LfnstZeroOutSigCoeffFlag in Table 4 is 0 if there is a significant coefficient at a zero-out position when the LFNST is applied, and is 1 otherwise. The variable LfnstZeroOutSigCoeffFlag may be set according to a plurality of conditions shown below in Table 11.

The variable LfnstZeroOutSigCoeffFlag indicates whether a significant coefficient exists in a second region other than a top-left first region of a current block. The value of the variable is initially set to 1, and may be changed to 0 when a significant coefficient exists in the second region. An LFNST index may be parsed only when the initially set value of the variable LfnstZeroOutSigCoeffFlag is maintained. When determining and deriving whether the value of the variable LfnstZeroOutSigCoeffFlag is 1, the LFNST may be applied to a luma component or all chroma component of the current block, and thus a color index of the current block is not determined.

According to an example, a variable LfnstDcOnly in Table 4 is 1 when all last significant coefficients for transform blocks for which a corresponding coded block flag (CBF, which is 1 when there is at least one significant coefficient in a corresponding block, and is 0 otherwise) is 1 are at DC positions (top-left positions), and is 0 otherwise. Specifically, the position of the last significant coefficient is checked with respect to one luma transform block in a dual-tree luma, and the position of the last significant coefficient is checked with respect to both a transform block for Cb and a transform block for Cr in a dual-tree chroma. In a single tree, the position of the last significant coefficient may be checked with respect to transform blocks for luma, Cb, and Cr.

A syntax table of a coding unit signaling an LFNST index according to another example is as follows.

TABLE 7

```
coding_unit( x0, y0, cbWidth, cbHeight, cqtDepth, treeType, modeType ) {
......
        LfnstDcOnly = 1
    LfnstZeroOutSigCoeffFlag = 1
    MtsZeroOutSigCoeffFlag = 1
    transform_tree( x0, y0, cbWidth, cbHeight, treeType, chType )
    lfnstWidth = ( treeType = = DUAL_TREE_CHROMA ) ? cbWidth / SubWidthC
                : ( ( IntraSubPartitionsSplitType = = ISP_VER_SPLIT ) ? cbWidth /
                  NumIntraSubPartitions : cbWidth )
    lfnstHeight = ( treeType = = DUAL_TREE_CHROMA ) ? cbHeight / SubHeightC
                : ( ( IntraSubPartitionsSplitType = = ISP_HOR_SPLIT) ? cbHeight /
                  NumIntraSubPartitions : cbHeight )
        LfnstNotSkipFlag = ( treeType = = SINGLE_TREE ) ?
    transform_skip_flag[ x0 ][ y0 ][ 0 ] = = 0 &&
    transform_skip_flag[ x0 ][ y0 ][ 1 ] = = 0 && transform_skip_flag[ x0 ][ y0 ][ 2 ] = = 0
    :( treeType = = DUAL_TREE_LUMA ) ? transform_skip_flag[ x0 ][ y0 ][ 0 ] = = 0
    : ( transform_skip_flag[ x0 ][ y0 ][ 1 ] = = 0 &&
        transform_skip_flag[ x0 ][ y0 ][ 2 ] = = 0 )
    if( Min( lfnstWidth, lfnstHeight ) >= 4 && sps_lfnst_enabled_flag = = 1 &&
      CuPredMode[ chType ][ x0 ][ y0 ] = = MODE_INTRA &&
      LfnstNotSkipFlag &&
      ( treeType != DUAL_TREE_CHROMA || ( !intra_mip_flag[ x0 ][ y0 ] ||
        Min( lfnstWidth, lfnstHeight ) >= 16 ) ) &&
      Max( cbWidth, cbHeight ) <= MaxTbSizeY ) {
      if( ( IntraSubPartitionsSplitType != ISP_NO_SPLIT || LfnstDcOnly = = 0 ) &&
        LfnstZeroOutSigCoeffFlag = = 1 )
        lfnst_idx                                                                               ae(v)
    }
......
```

In Table 7, a variable transform_skip_flag[x0] [y0][cIdx] indicates whether a transform skip is applied to a coding block for a component indicated by cIdx. cIdx may have values of 0, 1, and 2, where 0 indicates a luma component, and 1 and 2 indicate a Cb component and a Cr component, respectively. The value of transform_skip_flag[x0][y0] [cIdx] equal to 1 indicates that a transform skip is applied, and 0 indicates that a transform skip is not applied.

In Table 7, a variable LfnstNotSkipFlag may be set to 1 only when a transform skip is not applied to all components (all coding blocks) forming a current coding unit, and may be set to 0 in other cases, and an LFNST index (lfnst_idx in Table 7) may be signaled only when LfnstNotSkipFlag is 1.

When the current coding unit is coded in a single tree structure (when treeType is SINGLE_TREE in Table 7), all of the components include Y, Cb, and Cr, when the current coding unit is coded in a separate tree structure for a luma (when treeType is DUAL_TREE_LUMA in Table 7), all of the components include only Y, and when the current coding unit is coded in a separate tree structure for a chroma (when treeType is DUAL_TREE_CHROMA in Table 7), all of the components include Cb and Cr.

In other words, when even one of the components consisting of the current coding unit is coded by a transform skip, the LFNST index is not signaled, and the value of the LFNST index is inferred to be 0. That is, no LFNST is applied.

In a structure restricting an LFNST not to be applied when even one of the components (Y, Cb, and Cr) is coded by the transform skip as in Table 7, when a plurality of components (Y, Cb, and Cr) is consecutively coded as in a single tree and a component is determined to be subjected to a transform skip (e.g., when a transform skip is determined for Cb and Cr) during parsing, corresponding transform coefficients may be configured not to be additionally buffered with respect to corresponding components coded by the transform skip until the value of an LFNST index is parsed.

For example, when any one component is found to be coded by the transform skip, it is sure that no LFNST is applied, and thus inverse quantization, inverse transform, and the like may be performed immediately subsequently.

Instead of Table 7, a syntax table may be concisely described as in Table 8.

TABLE 8

```
coding_unit( x0, y0, cbWidth, cbHeight, cqtDepth, treeType, modeType ) {
......
        if( Min( lfnstWidth, lfnstHeight ) >= 4 && sps_lfnst_enabled_flag = = 1 &&
            CuPredMode[ chType ][ x0 ][ y0 ] = = MODE_INTRA &&
            (treeType == DUAL_TREE_CHROMA || transform_skip_flag[ x0 ][ y0 ][ 0 ] = = 0)
    &&
            (treeType == DUAL_TREE_LUMA || (transform_skip_flag[ x0 ][ y0 ][ 1 ] = = 0 &&
                transform_skip_flag[ x0 ][ y0 ][ 2 ] = = 0)) &&
            ( treeType = = DUAL_TREE_CHROMA || !intra_mip_flag[ x0 ][ y0 ] ||
                Min( lfnstWidth, lfnstHeight ) >= 16 ) &&
            Max( cbWidth, cbHeight ) <= MaxTbSizeY ) (
            if( ( IntraSubPartitionsSplitType != ISP_NO_SPLIT || LfnstDcOnly = = 0 ) &&
```

TABLE 8-continued

```
                LfnstZeroOutSigCoeffFlag = = 1 )
            lfnst_idx                                                              ae(v)
        }
......
```

When determining whether to signal an LFNST index by checking only whether a transform skip is applied to a luma component in a single tree, a syntax table for a coding unit may be configured as follows.

TABLE 9

```
coding_unit( x0, y0, cbWidth, cbHeight, cqtDepth, treeType, modeType ) {
......
    LfnstDcOnly = 1
    LfnstZeroOutSigCoeffFlag = 1
    MtsZeroOutSigCoeffFlag = 1
    transform_tree( x0, y0, cbWidth, cbHeight, treeType, chType )
    lfnstWidth = ( treeType = = DUAL_TREE_CHROMA ) ? cbWidth / SubWidthC
                    : ( ( IntraSubPartitionsSplitType = = ISP_VER_SPLIT ) ? cbWidth /
                        NumIntraSubPartitions : cbWidth )
    lfnstHeight = ( treeType = = DUAL_TREE_CHROMA ) ? cbHeight / SubHeightC
                    : ( ( IntraSubPartitionsSplitType = = ISP_HOR_SPLIT) ? cbHeight /
                        NumIntraSubPartitions : cbHeight )
            LfnstNotSkipFlag = ( treeType = = DUAL_TREE_CHROMA ) ?
( transform_skip_flag[ x0 ][ y0 ][ 1 ] = = 0 && transform_skip_flag[ x0 ][ y0 ][ 2 ]
= = 0 ) : ( transform_skip_flag[ x0 ][ y0 ][ 0 ] = = 0 )
        if( Min( lfnstWidth, lfnstHeight ) >= 4 && sps_lfnst_enabled_flag = = 1 &&
            CuPredMode[ chType ][ x0 ][ y0 ] = = MODE_INTRA &&
            LfnstNotSkipFlag &&
            ( treeType != DUAL_TREE_CHROMA || ( !intra_mip_flag[ x0 ][ y0 ] ||
            Min( lfnstWidth, lfnstHeight ) >= 16 ) ) &&
            Max( cbWidth, cbHeight ) <= MaxTbSizeY ) {
            if( ( IntraSubPartitionsSplitType != ISP_NO_SPLIT || LfnstDcOnly = = 0 )
&&
                LfnstZeroOutSigCoeffFlag = = 1 )
            lfnst_idx                                                              ae(v)
        }
......
```

In Table 9, LfnstNotSkipFlag is determined the same as in Table 7 or Table 8 in a separate tree (i.e., in a luma separate tree, LfnstNotSkipFlag is set to 1 when a transform skip is not applied to a luma component, and is set to 0 otherwise, and in a chroma separate tree, LfnstNotSkipFlag is set to 1 when no transform skip is applied to both a Cb component and a Cr component, and is set to 0 otherwise). In a single tree, LfnstNotSkipFlag is set to 1 when no transform skip is applied only to a luma component, and is set to 0 otherwise. Instead of Table 8, a syntax table shown in Table 9 may be applied.

An embodiment of determining an LFNST index signaling condition when applying an LFNST only to a luma component in a single tree is described below.

In the coding unit syntax tables of Table 4 and Table 5, Table 7, Table 8, Table 9, and Table 10, the variable LfnstDcOnly and the variable LfnstZeroOutSigCoeffFlag are used as conditions for signaling an LFNST index. Basically, both the variable LfnstDcOnly and the variable LfnstZeroOutSigCoeffFlag are initialized to 1 as shown in Table 7, and the values of the two variables may be updated to 0 in a syntax table for residual coding as shown in Table

TABLE 10

```
coding_unit( x0, y0, cbWidth, cbHeight, cqtDepth, treeType, modeType ) {
......
    if( Min( lfnstWidth, lfnstHeight ) >= 4 && spa_lfnst_enabled_flag = = 1 &&
        CuPredMode[ chType ][ x0 ][ y0 ] = = MODE_INTRA &&
        (treeType == DUAL_TREE_CHROMA || transform_skip_flag[ x0 ][ y0 ][ 0 ] = = 0)
&&
        (treeType == DUAL_TREE_LUMA || treeType == SINGLE_TREE ||
            ( transform_skip_flag[ x0 ][ y0 ][ 1 ] = = 0 &&
            transform_skip_flag[ x0 ][ y0 ][ 2 ] = = 0 ) ) &&
        ( treeType = = DUAL_TREE_CHROMA || !intra_mip_flag[ x0 ][ y0 ] ||
            Min( lfnstWidth, lfnstHeight ) >= 16 ) &&
            Max( cbWidth, cbHeight) <= MaxTbSizeY ) {
        if( ( IntraSubPartitionsSpliType != ISP_NO_SPLIT || LfnstDcOnly = = 0 ) &&
            LfnstZeroOutSigCoeffFlag = = 1 )
        lfnst_idx                                                                  ae(v)
    }
......
```

11. For reference, when a component (which may be Y, Cb, or Cr) is coded with a transform skip, a different syntax table (transform_ts_coding) is imported instead of importing the residual coding in Table 11, and thus the variable LfnstDcOnly and the variable LfnstZeroOutSigCoeffFlag are not updated when an LFNST index for the component is parsed.

lastScanPos indicates the position of the last significant coefficient within one subblock in the scan order. When one subblock includes 16 positions, values from 0 to 15 are possible.

LastSignificantCoeffX and LastSignificantCoeffY indicate the x-coordinate and the y-coordinate of the last significant coefficient positioned in a transform block. X-coor-

TABLE 11

| residual_coding( x0, y0, log2TbWidth, log2TbHeight, cIdx ) { | Descriptor |
|---|---|
|   if( sps_mts_enabled_flag && cu_sbt_flag && cIdx = = 0 &&<br>     log2TbWidth = = 5 && log2TbHeight < 6 )<br>    log2ZoTbWidth = 4<br>  Else<br>    log2ZoTbWidth = Min( log2TbWidth, 5 )<br>  if( sps_mts_enabled_flag && cu_sbt_flag && cIdx = = 0 &&<br>     log2TbWidth < 6 && log2TbHeight = = 5 )<br>    log2ZoTbHeight = 4<br>  Else<br>    log2ZoTbHeight = Min( log2TbHeight, 5 )<br>  if( log2TbWidth > 0 )<br>    last_sig_coeff_x_prefix | ae(v) |
|   if( log2TbHeight > 0 )<br>    last_sig_coeff_y_prefix | ae(v) |
|   if( last_sig_coeff_x_prefix > 3 )<br>    last_sig_coeff_x_suffix | ae(v) |
|   if( last_sig_coeff_y_prefix > 3 )<br>    last_sig_coeff_y_suffix | ae(v) |
|   log2TbWidth = log2ZoTbWidth<br>  log2TbHeight = log2ZoTbHeight<br>  remBinsPass1 = ( ( 1 << ( log2TbWidth + log2TbHeight ) ) * 7 ) >> 2<br>  log2SbW = ( Min( log2TbWidth, log2TbHeight ) < 2 ? 1 : 2 )<br>  log2SbH = log2SbW<br>  if( log2TbWidth + log2TbHeight > 3 ) {<br>    if( log2TbWidth < 2 ) {<br>      log2SbW = log2TbWidth<br>      log2SbH = 4 − log2SbW<br>    } else if( log2TbHeight < 2 ) {<br>      log2SbH = log2TbHeight<br>      log2SW = 4 − log2SbH<br>    }<br>  }<br>  numSbCoeff = 1 << ( log2SbW + log2SbH )<br>  lastScanPos = numSbCoeff<br>  lastSubBlock = ( 1 << ( log2TbWidth + log2TbHeight − ( log2SbW + log2SbH ) ) ) − 1<br>  do {<br>    if( lastScanPos = = 0 ) {<br>      lastScanPos = numSbCoeff<br>      lastSubBlock− −<br>    }<br>    lastScanPos− −<br>    xS = DiagScanOrder[ log2TbWidth − log2SbW ][ log2TbHeight − log2SbH ]<br>            [ lastSubBlock ][ 0 ]<br>    yS = DiagScanOrder[ log2TbWidth − log2SbW ][ log2TbHeight − log2SbH ]<br>            [ lastSubBlock ][ 1 ]<br>    xC = ( xS << log2SbW ) + DiagScanOrder[ log2SbW ][ log2SbH ][ lastScanPos ][ 0 ]<br>    yC = ( yS << log2SbH ) + DiagScanOrder[ log2SbW ][ log2SbH ][ lastScanPos ][ 1 ]<br>  } while( ( xC != LastSignificantCoeffX ) || ( yC != LastSignificantCoeffY ) )<br>  if( lastSubBlock = = 0 && log2TbWidth >= 2 && log2TbHeight >= 2<br>&&<br>    !transform_skip_flag[ x0 ][ y0 ][ cIdx ] && lastScanPos > 0 )<br>    LfnsfDcOnly = 0<br>  if( ( lastSubBlock > 0 && log2TbWidth >= 2 && log2TbHeight >= 2 ) ||<br>    ( lastScanPos > 7 && ( log2TbWidth = = 2 || log2TbWidth = = 3 ) &&<br>    log2TbWidth = = log2TbHeight ) )<br>    LfnstZeroOutSigCoeffFlag = 0 | |

......

In Table 11, lastSubBlock indicates the position of a subblock (coefficient group (CG)) in which the last significant (non-zero) coefficient is positioned in a scan order. 0 indicates a subblock including a DC component, and a value of greater than 0 indicates a subblock not including a DC component.

dinates start from 0 and increase from left to right, and y-coordinates start from 0 and increase from top to bottom. The values of the two variables equal to 0 mean that the last significant coefficient is positioned at a DC.

Basically, Table 11 is applied to the embodiment of Table 5 to determine the values of the variable LfnstDcOnly and the variable LfnstZeroOutSigCoeffFlag. When Table 11 is applied and the coding block is coded in a single tree, residual coding presented in Table 11 may be imported for all components. For example, when all of the Y, Cb, and Cr components are not coded with a transform skip, residual coding may be performed on every component.

Therefore, when Table 11 is applied and the current coding block is coded by the single tree, if the last non-zero coefficient of even one component is positioned at a position other than the DC position (top-left position of the transform block), the value of the variable LfnstDcOnly may be updated to 0, and when the position of the last non-zero coefficient of even one component is positioned in a region where a transform coefficient in a case where an LFNST is applied cannot be positioned (i.e., positioned in a region other than first to eighth positions according to a forward transform coefficient scan order in a 4×4 transform block or an 8×8 transform block or positioned in a region other than a top-left 4×4 region in a transform block to which an LFNST is applicable in the current VVC standard), the value of the variable LfnstZeroOutSigCoeffFlag may be updated to 0. As shown in the coding unit syntax table of Table 5, Table 7, Table 8, Table 9, and Table 10, the LFNST index may be signaled only when the value of the variable LfnstZeroOutSigCoeffFlag is 1, and in a mode other than the ISP mode, the LFNST index may be signaled only when the value of the variable LfnstDcOnly is 0.

However, when the LFNST is applied only to the luma component in the single tree, the variable LfnstDcOnly and the variable LfnstZeroOutSigCoeffFlag may be not allowed to be updated when residual coding is performed on components to which the LFNST is not applied (chroma components Cb or Cr). This is because it is logically unsuitable that the arrangement or distribution of transform coefficients for the component to which the LFNST is not applied determines whether the LFNST index is signaled, that is, whether the LFNST is applied.

Table 12 restricts the variable LfnstDcOnly and the variable LfnstZeroOutSigCoeffFlag to be updated only for the luma component in the single tree. In a case other than the single tree, the variable LfnstDcOnly and the variable LfnstZeroOutSigCoeffFlag may be updated for all components as in Table 11.

TABLE 12

| residual_coding( x0, y0, log2TbWidth, log2TbHeight, cIdx ) { | Descriptor |
|---|---|
| if( sps_mts_enabled_flag && cu_sbt_flag && cIdx = = 0 && | |
|     log2TbWidth = = 5 && log2TbHeight < 6 ) | |
|   log2ZoTbWidth = 4 | |
| Else | |
|   log2ZoTbWidth = Min( log2TbWidth, 5 ) | |
| if( sps_mts_enabled_flag && cu_sbt_flag && cIdx = = 0 && | |
|     log2TbWidth < 6 && log2TbHeight = = 5 ) | |
|   log2ZoTbHeight = 4 | |
| Else | |
|   log2ZoTbHeight = Min( log2TbHeight, 5 ) | |
| if( log2TbWidth > 0 ) | |
|   last_sig_coeff_x_prefix | ae(v) |
| if( log2TbHeight > 0 ) | |
|   last_sig_coeff_y_prefix | ae(v) |
| if( last_sig_coeff_x_prefix > 3 ) | |
|   last_sig_coeff_x_suffix | ae(v) |
| if( last_zig_coeff_y_prefix > 3 ) | |
|   last_sig_coeff_y_suffix | ae(v) |
| log2TbWidth = log2ZoTbWidth | |
| log2TbHeight = log2ZoTbHeight | |
| remBinsPass1 = ( ( 1 << ( log2TbWidth + log2TbHeight ) ) * 7 ) >> 2 | |
| log2SbW = ( Min( log2TbWidth, log2TbHeight ) < 2 ? 1 : 2 ) | |
| log2SbH = log2SbW | |
| if( log2TbWidth + log2TbHeight > 3 ) { | |
|   if( log2TbWidth < 2 ) { | |
|     log2SbW = log2TbWidth | |
|     log2SbH = 4 − log2SbW | |
|   } else if( log2TbHeight < 2 ) { | |
|     log2SbH = log2TbHeight | |
|     log2SbW = 4 − log2SbH | |
|   } | |
| } | |
| numSbCoeff = 1 << ( log2SbW + log2SbH ) | |
| lastScanPos = numSbCoeff | |
| lastSubBlock = ( 1 << ( log2TbWidth + log2TbHeight − ( log2SbW + log2SbH ) ) ) − 1 | |
| do { | |
|   if( lastScanPos = = 0 ) { | |
|     lastScanPos = sumSbCoeff | |
|     lastSubBlock− − | |
|   } | |
|   lastScanPos− − | |
|   xS = DiagScanOrder[ log2TbWidth − log2SbW ][ log2TbHeight − log2SbH ] | |
|     [ lastSubBlock ][ 0 ] | |
|   yS = DiagScanOrder[ log2TbWidth − log2SbW ][ log2TbHeight − log2SbH ] | |
|     [ lastSubBlock ][ 1 ] | |
|   xC = ( xS << log2SbW ) + DiagScanOrder[ log2SbW ][ log2SbH ][ lastScanPos ][ 0 ] | |
|   yC = ( yS << log2SbW ) + DiagScanOrder[ log2SbW ][ log2SbH ][ lastScanPos ][ 1 ] | |
| } while( ( xC != LastSignificantCoeffX ) || ( yC != LastSignificantCoeffY ) ) | |
|   if( treeType != SINGLE_TREE || cIdx = = 0 ) { | |
| if( lastSubBlock = = 0 && log2TbWidth >= 2 && log2TbHeight >= 2 | |

TABLE 12-continued

```
residual_coding( x0, y0, log2TbWidth, log2TbHeight, cIdx ) {                Descriptor
&&
       !transform_skip_flag[ x0 ][ y0 ][ cIdx ] && lastScanPos > 0 )
       LfnstDcOnly = 0
    if( ( lastSubBlock > 0 && !log2TbWidth >= 2 && log2TbHeight >= 2 ) ||
       ( lastScanPos > 7 && ( log2TbWidth = = 2 || log2TbWidth = = 3 ) &&
       log2TbWidth = = log2TbHeight ) )
       LfnstZeroOutSigCoeffFlag = 0
    }
 ......
```

In residual coding presented in Table 12, since treeType is added as a parameter compared to Table 11, the syntax table for the transform unit may be modified as shown in Table 13.

TABLE 13

```
transform_unit( x0, y0, tbWidth, tbHeight, treeType, subTuIndex, chType ) {        Descriptor ......
 if( tu_cbf_luma[ x0 ][ y0 ] && treeType != DUAL_TREE_CHROMA ) {
    if( sps_transform_skip_enabled_flag && !BdpcmFlag[ x0 ][ y0 ][ 0 ] &&
       tbWidth <= MaxTsSize && tbHeight <= MaxTsSize &&
       ( IntraSubPartitionsSplit[ x0 ][ y0 ] = = ISP_NO_SPLIT ) && !cu_sbt_flag )
       transform_skip_flag[ x0 ][ y0 ][ 0 ]                                         ae(v)
    if( transform_skip_flag[ x0 ][ y0 ][ 0 ] )
       residual_coding( x0, y0, Log2( tbWidth ), Log2( tbHeight ), 0, treeType )
    Else
       residual_ts_coding( x0, y0, Log2( tbWidth ), Log2( tbHeight ), 0 )
 }
 if( tu_cbf_cb[ xC ][ yC ] && treeType != DUAL_TREE_LUMA ) {
    if( sps_transform_skip_enabled_flag && !BdpcmFlag[ x0 ][y0 ][ 1 ] &&
       wC <= MaxTsSize && hC <= MaxTsSize && !cu_sbt_flag )
       transform_skip_flag[ xC ][ yC ][ 1 ]                                         ae(v)
    if( !transform_skip_flag[ xC ][ yC ][ 1 ] )
       residual_coding( xC, yC, Log2( wC ), Log2( hC ), 1, treeType )
    Else
       residual_ts_coding( xC, yC, Log2( wC ), Log2( hC ), 1 )
 }
 if( tu_cbf_cr[ xC ][ yC ] && treeType != DUAL_TREE_LUMA &&
    !( tu_cbf_cb[ xC ][ yC ] && tu_joint_cber_residual_flag[ xC ][ yC ] ) ) {
    if( sps_transform_skip_enabled_flag && !BdpcmFlag[ x0 ][ y0 ][ 2 ] &&
       wC <= MaxTsSize && hC <= MaxTsSize && !cu_sbt_flag )
       transform_skip_flag[ xC ][ yC ][ 2 ]                                         ae(v)
    if( !transform_skip_flag[ xC ][ yC ][ 2 ] )
       residual_coding( xC, yC, Log2( wC ), Log2( hC ), 2, treeType )
    Else
       residual_ts_coding( xC, yC, Log2( wC ), Log2( hC ), 2 )
  }
}
```

Based on the details of Table 5, some details may be replaced with the embodiments of Table 7 to Table 10, or the details of Table 11 or Table 12 may be applied. The following possible combinations may be configured based on Table 7 to Table 10, Table 11, or Table 12.

1. Table 7 (or Table 8)+Table 11
2. Table 7 (or Table 8)+Table 12
3. Table 9 (or Table 10)+Table 11
4. Table 9 (or Table 10)+Table 12

Hereinafter, a method for applying a scaling list to chroma components when an LFNST is applied only to a luma component in a single tree is described.

Currently, in VVC WD, a syntax element called scaling_matrix_for_lfnst_disabled_flag is defined. When scaling_matrix_for_lfnst_disabled_flag is 1, scaling list is not applied when an LFNST is applied, and when scaling_matrix_for_lfnst_disabled_flag is 0, the scaling list may be applied when the LFNST is applied.

Here, the scaling list is a matrix for specifying a specific weight (weighted value) for each transform coefficient position in a transform block and enables dequantization or quantization by multiplication by the weight for each transform coefficient, thus enabling differential dequantization or quantization to be applied according to the importance of the transform coefficient.

In the single tree, the LFNST may be applied only to the luma component as in the embodiment of Table 5, and when the value of scaling_matrix_for_lfnst_disabled_flag is 1 and the LFNST is applied while the coding block is coded in the single tree, the scaling list is not applied to the luma component. Here, the scaling list may be applied to a chroma component to which the LFNST is not applied.

Table 14 shows an example of a dequantization process (scaling process) to implement the above case.

TABLE 14

8.7.3 Scaling process for transform coefficients.
Inputs to this process are:
- a luma location ( xTbY, yTbY ) specifying the top-left sample of the current luma transform block
  relative to the top-left luma sample of the current picture,
-     a variable nTbW specifying the transform block width,
-     a variable nTbH specifying the transform block height,
- a variable predMode specifying the prediction mode of the coding unit,
- a variable cIdx specifying the colour component of the current block.
- a variable treeType specifying whether a single tree (SINGLE_TREE) or a dual tree is used to partition
  the coding tree node and, when a dual tree is used, whether the luma (DUAL_TREE_LUMA) or chroma
  components (DUAL_TREE_CHROMA) are currently processed.
Output of this process is the (nTbW)x(nTbH) array d of scaled transform coefficients with elements d[ x ][ y ].
The quantization parameter qP is derived as follows:
-     If cIdx is equal to 0, the following applies:
      qP = Qp'$_Y$
-     Otherwise, if TuCResMode[ xTbY ][ yTbY ] is equal to 2, the following applies:
      qP = Qp'$_{CbCr}$
-     Otherwise, if cIdx is equal to 1, the following applies:
      qP = Qp'$_{Cb}$
-     Otherwise (cIdx is equal to 2), the following applies:
      qP = Qp'$_{Cr}$
The quantization parameter qP is modified and the variables rectNonTsFlag and bdShift are derived as follows:
-     If transform_skip_flag[ xTbY ][ yTbY ][ cIdx ] is equal to 0, the following applies:
      qP = qP − ( cu_act_enabled_flag[ xTbY ][ yTbY ] ? 5 : 0 )
      rectNonTsFlag = ( ( ( Log2( nTbW ) + Log2( nTbH ) ) & 1 ) = = 1 ) ? 1 : 0
      bdShift = BitDepth + rectNonTsFlag +
              ( ( Log2( nTbW ) + Log2( nTbH ) ) / 2 ) − 5 + pic_dep_quant_enabled_flag
-     Otherwise (transform_skip_flag[ xTbY ][ yTbY ][ cIdx ] is equal to 1), the following applies:
      qP = Max( QpPrimeTsMin, qP ) − ( cu_act_enabled_flag[ xTbY ][ yTbY ] ? 5 : 0 )
      rectNonTsFlag = 0
      bdShift = 10

The variable bdOffset is derived as follows:
    bdOffset = ( 1 << bdShift ) >> 1
The list levelScale[ ][ ] is specified as levelScale[ j ][ k ] = { { 40, 45, 51, 57, 64, 72 }, { 57, 64, 72, 80, 90,
102 } } with j = 0..1, k = 0..5.
The (nTbW)x(nTbH) array dz is set equal to the (nTbW)x(nTbH) array
TransCoeffLevel[ xTbY ][ yTbY ][ cIdx ].
For the derivation of the scaled transform coefficients d[ x ][ y ] with x = 0..nTbW − 1, y = 0..nTbH − 1, the
following applies:
-     The intermediate scaling factor m[ x ][ y ] is derived as follows:
      -    If one or more of the following conditions are true, m[ x ][ y ] is set equal to 16:
           ■ sps_scaling_list_enabled_flag is equal to 0.
           ■ pic_scaling_list_present_flag is equal to 0.
           ■ transform_skip_flag[ xTbY ][ yTbY ][ cIdx ] is equal to 1.
           ■ scaling_matrix_for_lfnst_disabled_flag is equal to 1 and lfnst_idx[ xTbY ][ yTbY ] is not
             equal to 0 and one of the following conditions are true.
                • treeType is equal to SINGLE_TREE and cIdx is equal to 0.
                • treeType is equal to DUAL_TREE_LUMA or DUAL_TREE_CHROMA.
      - Otherwise, the following applies:
           ■ The variable id is derived based on predMode, cIdx, nTbW, and nTbH as specified in
             Table 36 and the variable log2MatrixSize is derived as follows:
             log2MatrixSize = ( id < 2 ) ? 1 : ( id < 8 ) ? 2 : 3
           ■ The scaling factor m[ x ][ y ] is derived as follows:
             m[ x ][ y ] = ScalingMatrixRec[ id ][ i ][ j ]
             with i = ( x << log2MatrixSize ) >> Log2( nTbW ),
                  j = ( y << log2MatrixSize ) >> Log2( nTbH )
           ■ If id is greater than 13 and both x and y are equal to 0, m[ 0 ][ 0 ] is further modified as
             follows:
             m[ 0 ][ 0 ] = ScalingMatrixDCRec[ id − 14 ]
......

In Table 14, treeType indicates the tree type of a coding unit to which a currently processed transform block belongs, and SINGLE_TREE, DUAL_TREE_LUMA, and DUAL_TREE_CHROMA indicate a single tree, a separate tree for a luma, and a separate tree for a chroma (dual-tree chroma), respectively.

In this embodiment, since the LFNST may be applied only to a luma component in the single tree, when the value of scaling_matrix_for_lfnst_disabled_flag is 1 and the LFNST is applied (the lfnst_idx[xTbY][yTbY] value is greater than 0), a scaling list is not applied to the luma component (when the cIdx value is 0).

However, for a chroma component (when the cIdx value is greater than 0), whether to apply the scaling list may be determined by further checking a different condition (e.g., checking transform_skip_flag [xTbY][yTbY][cIdx]).

In a separate tree, as in the case of the luma component in the single tree, when the value of scaling_matrix_for_lfnst_disabled_flag is 1 and the LFNST is applied (lfnst_idx

[xTbY][yTbY] value is greater than 0), a scaling list is not applied to luma and chroma components.

Further, in the separate tree, as in the case of the chroma component in the single tree, whether to apply the scaling list may be determined by further checking a different condition (e.g., checking transform_skip_flag [xTbY][yTbY][cIdx]).

Therefore, when the value of scaling_matrix_for_lfnst_disabled_flag is 1 and the LFNST may be applied only to the luma component in the single tree, the scaling list may not be applied to the luma component and may be applied to the chroma component.

According to an example, a combination of Table 14 and the above embodiments (combination of replacing some details with the embodiments of Table 7 to Table 10 or applying the details of Table 11 or Table 12 based on the details of Table 5) may be applied.

In this case, as in the specification text of "Transform process for scaled transform coefficients" in Table 6, the LFNST may be configured to be applied only to the luma component in the single tree.

The following drawings are provided to describe specific examples of the present disclosure. Since specific terms for devices or specific terms for signals/messages/fields illustrated in the drawings are provided for illustration, technical features of the present disclosure are not limited to the specific terms used in the following drawings.

Figure 15:
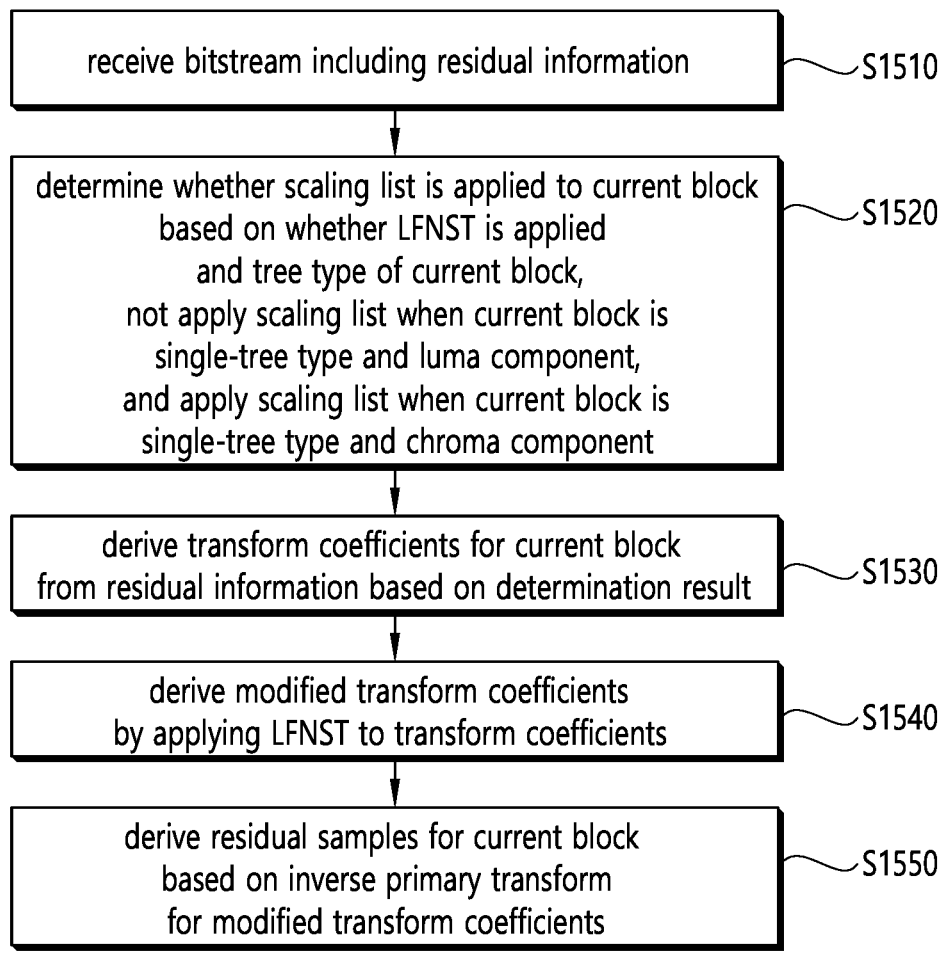
FIG. 15 is a diagram illustrating an image decoding method according to an example.

FIG. 15 is a flowchart illustrating an operation of a video decoding apparatus according to an embodiment of the present disclosure.

Each process disclosed in FIG. 15 is based on some of details described with reference to FIG. 4 to FIG. 14. Therefore, a description of specific details overlapping those described with reference to FIG. 3 to FIG. 14 will be omitted or will be schematically made.

The decoding apparatus 300 according to an embodiment may receive flag information indicating whether a scaling list is available when an LFNST is performed, an LFNST index for a current block, and residual information from a bitstream (S1510).

Specifically, the decoding apparatus 300 may decode information on quantized transform coefficients for the current block from the bitstream and may derive quantized transform coefficients for a target block based on the information on the quantized transform coefficients for the current block. Information on the quantized transform coefficients for the target block may be included in a sequence parameter set (SPS) or a slice header and may include at least one of information on whether an RST is applied, information on a reduced factor, information on a minimum transform size for applying an RST, information on a maximum transform size for applying an RST, an inverse RST size, and information on a transform index indicating any one of transform kernel matrices included in a transform set.

The decoding apparatus may further receive information on an intra prediction mode for the current block and information on whether an ISP is applied to the current block. The decoding apparatus may receive and parse flag information indicating whether to apply ISP coding or an ISP mode, thereby deriving whether the current block is split into a predetermined number of sub-partition transform blocks. Here, the current block may be a coding block. Further, the decoding apparatus may derive the size and number of split sub-partition blocks through flag information indicating a direction in which the current block is split.

The LFNST index is a value for specifying an LFNST matrix when the LFNST is applied as an inverse secondary non-separable transform and may have a value ranging from 0 to 2. For example, an LFNST index value of 0 may indicate that no LFNST is applied to the current block, an LFNST index value of 1 may indicate a first LFNST matrix, and an LFNST index value of 2 may indicate a second LFNST matrix.

The information on the ISP and the LFNST index may be received in a coding unit level.

The flag information indicating whether the scaling list is available when the LFNST is performed, which is received by the decoding apparatus, may be represented by scaling_matrix_for_lfnst_disabled_flag or sps_scaling_matrix_for_lfnst_disabled_flag and may be signaled in the sequence parameter set. A value of this flag equal to 1 indicates that the scaling list is not applied when the LFNST is applied, and a value of the flag equal to 0 indicates that the scaling list is applicable when the LFNST is applied. The scaling list is a matrix for specifying a specific weight (weighted value) for each transform coefficient position in a transform block and enables dequantization or quantization by multiplication by the weight for each transform coefficient, thus enabling differential dequantization or quantization to be applied according to the importance of the transform coefficient.

The decoding apparatus 300 may determine whether the scaling list is applied to the current block based on whether the LFNST is applied and the tree type of the current block in order to dequantize the transform coefficients for the current block (S1520).

Whether the scaling list is applied may be determined based on the flag information and the value of the LFNST index.

When the tree type of the current block is a single tree, color components of the current block may include a luma component, a first chroma component indicating chroma Cb, and a second chroma component indicating chroma Cr, and when the tree type of the current block is a dual-tree luma, the current block may include a luma component. When the tree type of the current block is a dual-tree chroma, the color components of the current block may include the first chroma component and the second chroma component.

Here, the current block may be a transform block, which is a transform unit, and when the tree type of the current block is the single tree, the current block may include a transform block for the luma component, a transform block for the first chroma component, and a transform block for the second chroma component. When the tree type of the current block is the dual-tree luma, the current block may include a transform block for the luma component, and when the tree type of the current block is the dual-tree chroma, the current block may include a transform block for the first chroma component and a transform block for the second chroma component.

According to an example, when the type of the current block is the single tree, the LFNST may be applied only to the luma component, and when the current block is coded in the single tree, the value of scaling_matrix_for_lfnst_disabled_flag is 1, and the LFNST is applied, the scaling list is not applied to the luma component. However, the scaling list may be applied to the chroma component to which no LFNST is applied.

In summary, in a case where the flag information on the scaling list indicates that the scaling list is unavailable and the LFNST index is greater than 0 (i.e., the LFNST is applied), when the tree type of the current block is the single tree and the current block is a luma component, the scaling list may not be applied, and when the tree type of the current block is the single tree and the current block is a chroma component, the scaling list may be applied.

According to an example, in a case where the flag information on the scaling list indicates that the scaling list is unavailable and the LFNST index is greater than 0, when the tree type of the current block is the dual-tree chroma, the LFNST is applicable to the current block, and thus the scaling list is not applied to the chroma component.

According to an example, in a case where the flag information on the scaling list indicates that the scaling list is unavailable and the LFNST index is greater than 0, when the tree type of the current block is the dual-tree luma, the LFNST is applicable to the current block, and thus the scaling list is not applied to the luma component.

Subsequently, the decoding apparatus derives transform coefficients for the current block from the residual information based on a determination result (S1530).

The derived transform coefficients may be arranged in 4×4 block units according to a reverse diagonal scan order, and transform coefficients in a 4×4 block may also be arranged according to the reverse diagonal scan order. That is, the dequantized transform coefficients may be arranged according to the reverse scan order applied in a video codec, such as in VVC or HEVC.

The decoding apparatus may derive modified transform coefficients from the transform coefficients based on the LFNST index and an LFNST matrix for the LFNST, that is, by applying the LFNST (S1540).

The LFNST is a non-separable transform in which a transform is applied to coefficients without separating the coefficients in a specific direction, unlike a primary transform of vertically or horizontally separating coefficients to be transformed and transforming the same. This non-separable transform may be a low-frequency non-separable transform of applying forward transform only to a low-frequency region rather than the entire area of a block.

The decoding apparatus may derive various variables to apply the LFNST and may determine whether to apply the LFNST based on the tree type and size of the current block.

The decoding apparatus may derive a first variable (variable LfnstDcOnly) indicating whether a significant coefficient exists at a position other than that of a DC component in the current block and a second variable (variable LfnstZeroOutSigCoeffFlag) indicating whether the transform coefficient exists in a second region other than a top-left first region of the current block.

The first variable and the second variable are initially set to 1, wherein the first variable may be updated to 0 when the significant coefficient exists at the position other than that of the DC component in the current block, and the second variable may be updated to 0 when the transform coefficient exists in the second region.

When the first variable is updated to 0 and the second variable is maintained as 1, the LFNST may be applied to the current block.

For the luma component to which the intra sub-partition (ISP) mode is applicable, the LFNST index may be parsed without deriving the variable LfnstDcOnly.

Specifically, in a case where the ISP mode is applied and a transform_skip_flag, i.e., transform_skip_flag[x0][y0][0], for the luma component is 0, when the tree type of the current block is the single tree or the dual tree for the luma, the LFNST index may be signaled regardless of the value of the variable LfnstDcOnly.

However, for the chroma component to which the ISP mode is not applied, the value of the variable LfnstDcOnly may be set to 0 according to the value of a transform_skip_flag for the chroma componentCb, transform_skip_flag[x0][y0][1], and the value of a transform_skip_flag for the chromacomponentCr, transform_skip_flag[x0][y0][2]. That is, when the value of cIdx in transform_skip_flag[x0][y0][cIdx] is 1, the value of the variable LfnstDcOnly may be set to 0 only when the value of transform_skip_flag[x0][y0][1] is 0, and when the value of cIdx is 2, the value of the variable LfnstDcOnly may be set to 0 only when the value of transform_skip_flag[x0][y0][2] is 0. When the value of the variable LfnstDcOnly is 0, the decoding apparatus may parse the LFNST index, and otherwise, the LFNST index may be inferred as 0 without being signaled.

The second variable may be a variable LfnstZeroOutSigCoeffFlag, which may indicate that a zero-out is performed when the LFNST is applied. The second variable may be initially set to 1, and may be changed to 0 when the significant coefficient exists in the second region.

The variable LfnstZeroOutSigCoeffFlag may be derived as 0 when the index of a subblock in which the last non-zero coefficient exists is greater than 0 and both the width and the height of the transform block is equal to or greater than 4 or when the position of the last non-zero coefficient in the subblock in which the last non-zero coefficient exists is greater than 7 and the size of the transform block is 4×4 or 8×8. A subblock refers to a 4×4 block used as a coding unit in residual coding and may be referred to as a coefficient group (CG). A subblock index of 0 refers to a top-left 4×4 subblock.

That is, when a non-zero coefficient is derived in a region other than a top-left region in which an LFNST transform coefficient may exist in the transform block or a non-zero coefficient exists at a position other than an eighth position in a scanning order for a 4×4 block or 8×8 block, the variable LfnstZeroOutSigCoeffFlag is set to 0.

The decoding apparatus may determine an LFNST set including LFNST matrices based on the intra prediction mode derived from the information on the intra prediction mode, and may select any one of a plurality of LFNST matrices based on the LFNST set and the LFNST index.

Here, the same LFNST set and the same LFNST index may be applied to sub-partition transform blocks into which the current block is split. That is, since the same intra prediction mode is applied to the sub-partition transform blocks, the LFNST set determined based on the intra prediction mode may also be equally applied to all of the sub-partition transform blocks. In addition, since the LFNST index is signaled in the coding unit level, the same LFNST matrix may be applied to the sub-partition transform blocks into which the current block is split.

As described above, a transform set may be determined according to an intra prediction mode for a transform block to be transformed, and an inverse LFNST may be performed based on a transform kernel matrix, that is, any one of the LFNST matrices, included in the transform set indicated by the LFNST index. The matrix applied to the inverse LFNST may be called an inverse LFNST matrix or an LFNST matrix, and is referred to by any term as long as the matrix is the transpose of the matrix used for the forward LFNST.

In an example, the inverse LFNST matrix may be a non-square matrix in which the number of columns is less than the number of rows.

The decoding apparatus may derive residual samples for the current block based on a primary inverse transform for the modified transform coefficients (S1550).

Here, as the primary inverse transform, a general separable transform may be used, or the foregoing MTS may be used.

Subsequently, the decoding apparatus 300 may generate reconstructed samples based on the residual samples for the current block and prediction samples for the current block.

The following drawings are provided to describe specific examples of the present disclosure. Since specific terms for devices or specific terms for signals/messages/fields illustrated in the drawings are provided for illustration, technical features of the present disclosure are not limited to the specific terms used in the following drawings.

Figure 16:
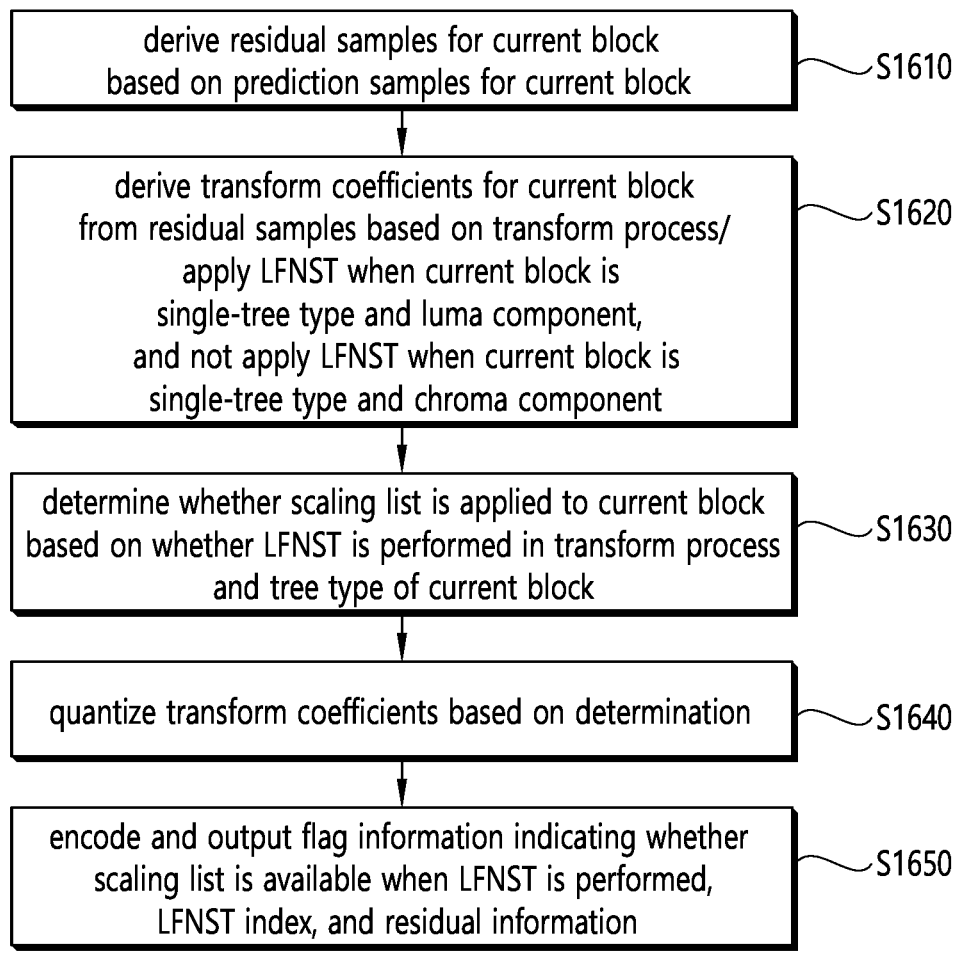
FIG. 16 is a diagram illustrating an image encoding method according to an example.

FIG. 16 is a flowchart illustrating an operation of a video encoding apparatus according to an embodiment of the present disclosure.

Each process disclosed in FIG. 16 is based on some of details described with reference to FIG. 4 to FIG. 14. Therefore, a description of specific details overlapping those described with reference to FIG. 2 and FIG. 4 to FIG. 14 will be omitted or will be schematically made.

The encoding apparatus 200 according to an embodiment may derive prediction samples for a current block based on an intra prediction mode applied to the current block.

When an ISP is applied to the current block, the encoding apparatus may perform prediction by each sub-partition transform block.

The encoding apparatus may determine whether to apply ISP coding or an ISP mode to the current block, that is, a coding block, and may determine a direction in which the current block is split and may derive the size and number of split subblocks according to a determination result.

The same intra prediction mode may be applied to sub-partition transform blocks into which the current block is split, and the encoding apparatus may derive a prediction sample for each sub-partition transform block. That is, the encoding apparatus sequentially performs intra prediction, for example, horizontally or vertically, or from left to right or from top to bottom, according to the split form of the sub-partition transform blocks. For the leftmost or uppermost subblock, a reconstructed pixel of a coding block already coded is referred to as in a conventional intra prediction method. Further, for each side of a subsequent internal sub-partition transform block, which is not adjacent to a previous sub-partition transform block, to derive reference pixels adjacent to the side, a reconstructed pixel of an adjacent coding block already coded is referred to as in the conventional intra prediction method.

The encoding apparatus 200 may derive residual samples for the current block based on the prediction samples (S1610).

The encoding apparatus 200 may derive transform coefficients for the current block by applying at least one of an LFNST or an MTS to the residual samples and may arrange the transform coefficients according to a predetermined scan order.

The encoding apparatus may derive the transform coefficients for the current block based on a transform process, such as a primary transform and/or a secondary transform, on the residual samples, may apply the LFNST when the current block is a single-tree type and a luma component, and may not apply the LFNST when the current block is the single-tree type and a chroma component (S1620).

The primary transform may be performed through a plurality of transform kernels as in the MTS, in which case a transform kernel may be selected based on the intra prediction mode.

The encoding apparatus 200 may determine whether to perform a secondary transform or a non-separable transform, specifically the LFNST, on the transform coefficients for the current block and may derive modified transform coefficients by applying the LFNST to the transform coefficients.

The LFNST is a non-separable transform in which a transform is applied to coefficients without separating the coefficients in a specific direction, unlike a primary transform of vertically or horizontally separating coefficients to be transformed and transforming the same. This non-separable transform may be a low-frequency non-separable transform of applying transform only to a low-frequency region rather than the entire target block to be transformed.

The encoding apparatus may derive various variables to apply the LFNST and may determine whether to apply the LFNST based on the tree type and size of the current block.

The encoding apparatus may derive a first variable (variable LfnstDcOnly) indicating whether a significant coefficient exists at a position other than that of a DC component in the current block and a second variable (variable LfnstZeroOutSigCoeffFlag) indicating whether the transform coefficient exists in a second region other than a top-left first region of the current block.

The first variable and the second variable are initially set to 1, wherein the first variable may be updated to 0 when the significant coefficient exists at the position other than that of the DC component in the current block, and the second variable may be updated to 0 when the transform coefficient exists in the second region.

When the first variable is updated to 0 and the second variable is maintained as 1, the LFNST may be applied to the current block.

For the luma component to which the intra sub-partition (ISP) mode is applicable, the LFNST may be applied without deriving the variable LfnstDcOnly.

Specifically, in a case where the ISP mode is applied and a transform_skip_flag, i.e., transform_skip_flag[x0][y0][0], for the luma component is 0, when the tree type of the current block is the single tree or the dual tree for the luma, the LFNST may be applied regardless of the value of the variable LfnstDcOnly.

However, for the chroma component to which the ISP mode is not applied, the value of the variable LfnstDcOnly may be set to 0 according to the value of a transform_skip_flag for the chroma component Cb, transform_skip_flag[x0][y0][1], and the value of a transform_skip_flag for the chromacomponent Cr, transform_skip_flag[x0][y0][2]. That is, when the value of cIdx in transform_skip_flag[x0][y0][cIdx] is 1, the value of the variable LfnstDcOnly may be set to 0 only when the value of transform_skip_flag[x0][y0][1] is 0, and when the value of cIdx is 2, the value of the variable LfnstDcOnly may be set to 0 only when the value of transform_skip_flag[x0][y0][2] is 0. When the value of the variable LfnstDcOnly is 0, the encoding apparatus may apply the LFNST, and otherwise, the encoding apparatus may not apply the LFNST.

The second variable may be a variable LfnstZeroOutSigCoeffFlag, which may indicate that a zero-out is performed when the LFNST is applied. The second variable may be initially set to 1, and may be changed to 0 when the significant coefficient exists in the second region.

The variable LfnstZeroOutSigCoeffFlag may be derived as 0 when the index of a subblock in which the last non-zero coefficient exists is greater than 0 and both the width and the height of the transform block is equal to or greater than 4 or when the position of the last non-zero coefficient in the subblock in which the last non-zero coefficient exists is greater than 7 and the size of the transform block is 4×4 or 8×8. A subblock refers to a 4×4 block used as a coding unit in residual coding and may be referred to as a coefficient group (CG). A subblock index of 0 refers to a top-left 4×4 subblock.

That is, when a non-zero coefficient is derived in a region other than a top-left region in which an LFNST transform coefficient may exist in the transform block or a non-zero coefficient exists at a position other than an eighth position in a scanning order for a 4×4 block or 8×8 block, the variable LfnstZeroOutSigCoeffFlag is set to 0.

The encoding apparatus may determine an LFNST set including LFNST matrices based on the intra prediction mode derived from the information on the intra prediction mode, and may select any one of a plurality of LFNST matrices.

Here, the same LFNST set and the same LFNST index may be applied to sub-partition transform blocks into which the current block is split. That is, since the same intra prediction mode is applied to the sub-partition transform blocks, the LFNST set determined based on the intra prediction mode may also be equally applied to all of the sub-partition transform blocks. In addition, since the LFNST index is signaled in the coding unit level, the same LFNST matrix may be applied to the sub-partition transform blocks into which the current block is split.

As described above, a transform set may be determined according to an intra prediction mode for a transform block to be transformed, and an LFNST may be performed based on a transform kernel matrix, that is, any one of LFNST matrices, included in an LFNST transform set. The matrix applied to the LFNST may be called an LFNST matrix or, and is referred to by any term as long as the matrix is the transpose of the matrix used for an inverse LFNST.

In an example, the LFNST matrix may be a non-square matrix in which the number of rows is less than the number of columns.

The encoding apparatus may determine whether a scaling list is applied to the current block based on whether the LFNST is performed in the transform process and the tree type of the current block (S1630).

The scaling list is a matrix for specifying a specific weight (weighted value) for each transform coefficient position in a transform block and enables dequantization or quantization by multiplication by the weight for each transform coefficient, thus enabling differential dequantization or quantization to be applied according to the importance of the transform coefficient.

According to an example, when the tree type of the current block is a single tree and the current block is a luma component, the encoding apparatus may not apply the scaling list, and when the tree type of the current block is the single tree and the current block is a chroma component, the encoding apparatus may apply the scaling list.

When the tree type of the current block is a single tree, color components of the current block may include a luma component, a first chroma component indicating chroma Cb, and a second chroma component indicating chroma Cr, and when the tree type of the current block is a dual-tree luma, the current block may include a luma component. When the tree type of the current block is a dual-tree chroma, the color components of the current block may include the first chroma component and the second chroma component.

Here, the current block may be a transform block, which is a transform unit, and when the tree type of the current block is the single tree, the current block may include a transform block for the luma component, a transform block for the first chroma component, and a transform block for the second chroma component. When the tree type of the current block is the dual-tree luma, the current block may include a transform block for the luma component, and when the tree type of the current block is the dual-tree chroma, the current block may include a transform block for the first chroma component and a transform block for the second chroma component.

According to an example, when the current block is the single tree, the encoding apparatus may apply the LFNST only to the luma component, and when the LFNST is applied, the encoding apparatus does not apply the scaling list to the luma component. However, the encoding apparatus may apply the scaling list to the chroma component to which no LFNST is applied.

In summary, in a case where the LFNST index is greater than 0 (i.e., the LFNST is applied), when the tree type of the current block is the single tree and the current block is the luma component, the encoding apparatus may not apply the scaling list, and when the tree type of the current block is the single tree and the current block is the chroma component, the encoding apparatus may apply the scaling list.

According to an example, in a case where the LFNST index is greater than 0, when the tree type of the current block is the dual-tree chroma, the LFNST is applicable to the current block, and thus the encoding apparatus does not apply the scaling list.

According to an example, in a case where the LFNST index is greater than 0, when the tree type of the current block is the dual-tree luma, the LFNST is applicable to the current block, and thus the encoding apparatus does not apply the scaling list.

The encoding apparatus may quantize the transform coefficients based on the determination, that is, whether the scaling list is applied to the current block (S1640).

That is, the encoding apparatus may quantize the transform coefficients for a transform block to which the LFNST is not applied using the scaling list and may quantize the transform coefficients for a transform block to which the LFNST is applied without using the scaling list.

The encoding apparatus may encode and output residual information and flag information indicating whether the scaling list is available when the LFNST is performed (S1650).

The flag information indicating whether the scaling list is available when the LFNST is performed may be represented by scaling_matrix_for_lfnst_disabled_flag or sps_scaling_matrix_for_lfnst_disabled_flag and may be signaled in the sequence parameter set. A value of this flag equal to 1 indicates that the scaling list is not applied when the LFNST is applied, and a value of the flag equal to 0 indicates that the scaling list is applicable when the LFNST is applied.

When the LFNST index is greater than 0 and the current block is the single tree, the LFNST is applicable to the luma component, and thus the encoding apparatus may encode the value of the flag to 1.

However, when the LFNST index is greater than 0 and the current block is the single tree, the LFNST is not applied to the chroma component, and thus the encoding apparatus may construct image information so that the scaling list may be applied.

When the LFNST index is greater than 0 and the tree type of the current block is the dual-tree chroma, the LFNST is applicable to the current block, and thus the encoding apparatus may encode the value of the flag to 1 so that the scaling list is not applied to the chroma component.

According to an example, when the LFNST index is greater than 0 and the tree type of the current block is the dual-tree luma, the LFNST is applicable to the current block, and thus the encoding apparatus may encode the value of the flag to 1 so that the scaling list is not applied to the luma component.

The encoding apparatus may derive quantized transform coefficients by quantizing the modified transform coefficients for the current block and may encode the LFNST index.

The encoding apparatus may generate residual information including the information on the quantized transform coefficients. The residual information may include the foregoing transform-related information/syntax element. The encoding apparatus may encode image/video information including the residual information and may output the image/video information in the form of a bitstream.

Specifically, the encoding apparatus 200 may generate the information on the quantized transform coefficients and may encode the information on the quantized transform coefficients.

A syntax element of the LFNST index according to the present embodiment may indicate any one of whether the (inverse) LFNST is applied and any one of LFNST matrices included in the LFNST set, and when the LFNST set includes two transform kernel matrices, the syntax element of the LFNST index may have three values.

According to an example, when the split tree structure of the current block is a dual-tree type, the LFNST index may be encoded for each of a luma block and a chroma block.

According to an embodiment, the values of the syntax element of the transform index may include 0 indicating that no(inverse) LFNST is applied to the current block, 1 indicating a first LFNST matrix among the LFNST matrices, and 2 indicating a second LFNST matrix among the LFNST matrices.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual coefficient, or may still be referred to as a transform coefficient for consistency of expression.

In addition, in the present disclosure, a quantized transform coefficient and a transform coefficient may be referred to as a transform coefficient and a scaled transform coefficient, respectively. In this case, residual information may include information on a transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. These details may also be applied/expressed in other parts of the present disclosure.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Figure 17:
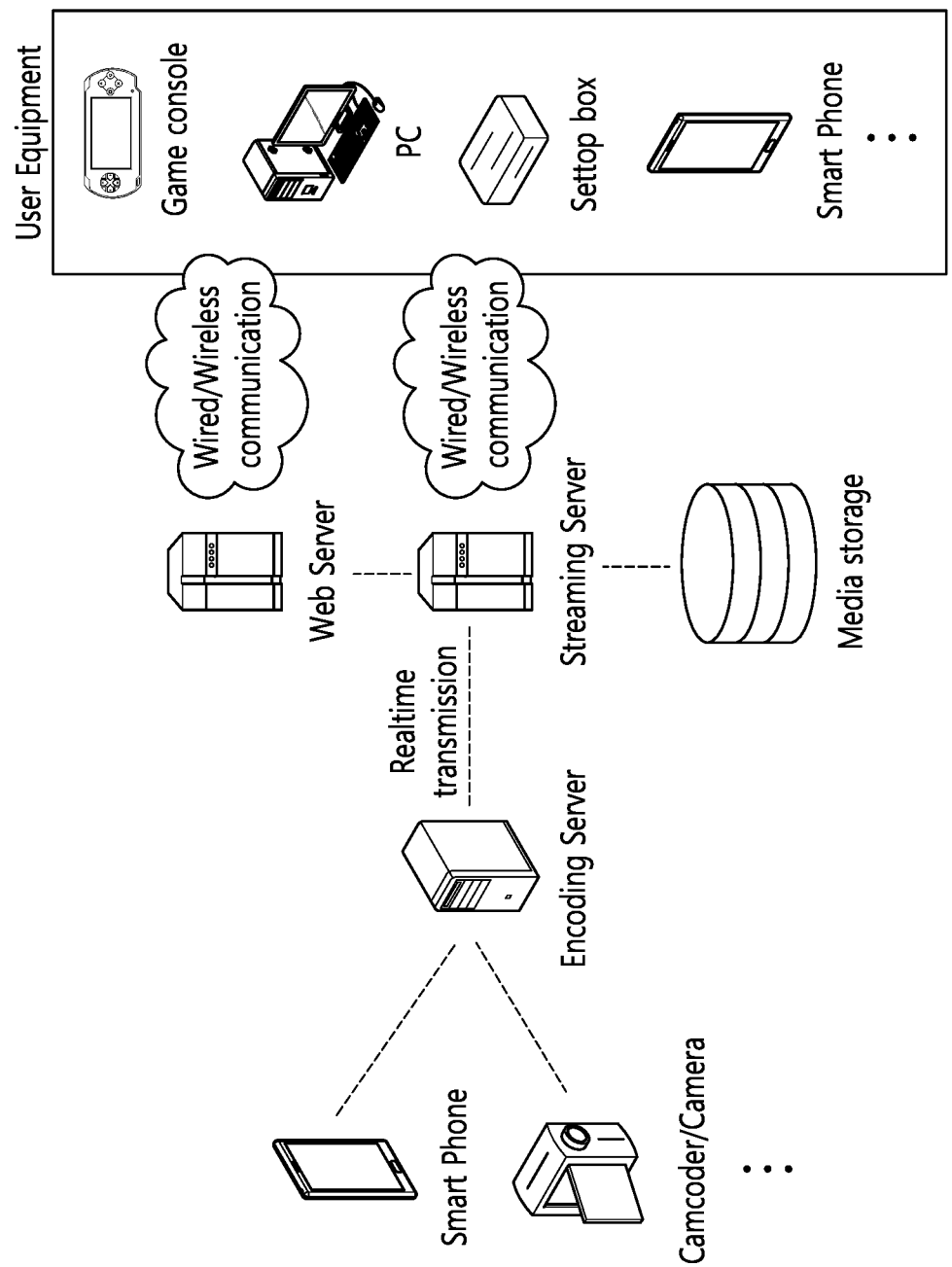
FIG. 17 illustrates the structure of a content streaming system to which the present disclosure is applied.

FIG. 17 illustrates the structure of a content streaming system to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus, and technical features of method claims and apparatus claims can be combined to be implemented or performed in a method.

What is claimed is:

1. An image decoding method performed by a decoding apparatus, comprising:
    deriving transform coefficients for a current block based on residual information received from a bitstream; and
    deriving residual samples for the current block based on an inverse transform for the transform coefficients,
    wherein the bitstream includes flag information indicating whether a scaling list is available for a block to which a low frequency non-separable transform (LFNST) is applied,
    wherein deriving the transform coefficients comprises:
    determining whether the scaling list is applied for dequantization of the current block based on the flag information, an LFNST index of the current block, and a tree type of the current block; and
    deriving the transform coefficients for the current block from the residual information based on the determination,
    wherein based on the flag information indicating that the scaling list is not available for the block to which the LFNST is applied, the LFNST index being greater than 0, and the tree type of the current block being a single tree, the scaling list is applied to a chroma component of the current block, and
    wherein based on the flag information indicating that the scaling list is not available for the block to which the LFNST is applied, the LFNST index being greater than 0, and the tree type of the current block being a dual-tree luma, the scaling list is not applied to a luma component of the current block.

2. The image decoding method of claim 1, wherein based on the flag information indicating that the scaling list is not available for the block to which the LFNST is applied, the LFNST index being greater than 0, and the tree type of the current block being the single tree, the scaling list is not applied to the luma component of the current block.

3. The image decoding method of claim 1, wherein based on the flag information indicating that the scaling list is not available for the block to which the LFNST is applied, the LFNST index being greater than 0, and the tree type of the current block being a dual-tree chroma, the scaling list is not applied to the chroma component of the current block.

4. An image encoding method performed by an image encoding apparatus, comprising:
    deriving transform coefficients for a current block from residual samples for the current block based on a transform process;
    determining whether a scaling list is applied for quantization of the current block; and
    quantizing the transform coefficients based on the determination,
    wherein whether the scaling list is applied is determined based on flag information, a low frequency non-separable transform (LFNST) index of the current block, and a tree type of the current block,
    wherein the flag information is encoded, into a bitstream, to indicate whether the scaling list is available for a block to which an LFNST is applied,
    wherein based on the flag information indicating that the scaling list is not available for the block to which the LFNST is applied, the LFNST index being greater than 0, and the tree type of the current block being a single tree, the scaling list is applied to a chroma component of the current block, and
    wherein based on the flag information indicating that the scaling list is not available for the block to which the LFNST is applied, the LFNST index being greater than 0, and the tree type of the current block being a dual-tree luma, the scaling list is not applied to a luma component of the current block.

5. The image encoding method of claim 4, wherein based on the flag information indicating that the scaling list is not available for the block to which the LFNST is applied, the LFNST index being greater than 0, and the tree type of the current block being the single tree, the scaling list is not applied to the luma component of the current block.

6. The image encoding method of claim 4, wherein based on the flag information indicating that the scaling list is not available for the block to which the LFNST is applied, the LFNST index being greater than 0, and the tree type of the current block being a dual-tree chroma, the scaling list is not applied to the chroma component of the current block.

7. A method for transmitting data for image information, comprising:
   obtaining a bitstream for the image information, wherein the bitstream is generated based on deriving transform coefficients for a current block from residual samples for the current block based on a transform process, determining whether a scaling list is applied for quantization of the current block, quantizing the transform coefficients based on the determination, and encoding residual information related to the quantized transform coefficients to generate the bitstream; and
   transmitting the data comprising the bitstream,
   wherein whether the scaling list is applied is determined based on flag information, a low frequency non-separable transform (LFNST) index of the current block, and a tree type of the current block,
   wherein the flag information is encoded, into the bitstream, to indicate whether the scaling list is available for a block to which an LFNST is applied,
   wherein based on the flag information indicating that the scaling list is not available for the block to which the LFNST is applied, the LFNST index being greater than 0, and the tree type of the current block being a single tree, the scaling list is applied to a chroma component of the current block, and
   wherein based on the flag information indicating that the scaling list is not available for the block to which the LFNST is applied, the LFNST index being greater than 0, and the tree type of the current block being a dual-tree luma, the scaling list is not applied to a luma component of the current block.

* * * * *